United States Patent [19]

Nagai

[11] Patent Number: 5,631,735
[45] Date of Patent: May 20, 1997

[54] SPECTROMETER PROVIDED WITH AN OPTICAL SHUTTER

[75] Inventor: Yoshiroh Nagai, Osaka, Japan

[73] Assignee: Minolta Co., Ltd., Osaka, Japan

[21] Appl. No.: 648,616

[22] Filed: May 16, 1996

Related U.S. Application Data

[60] Division of Ser. No. 518,194, Aug. 23, 1995, Pat. No. 5,510,180, which is a continuation-in-part of Ser. No. 290,231, Aug. 15, 1994, Pat. No. 5,457,530.

[30] Foreign Application Priority Data

Aug. 27, 1993 [JP] Japan ..................... 5-213122

[51] Int. Cl.$^6$ ..................... G01J 3/04; G01J 3/28; G01F 1/00
[52] U.S. Cl. ..................... 356/330; 356/310; 359/323
[58] Field of Search ..................... 356/310, 330, 356/333; 359/41, 323, 615, 566, 570, 124, 128, 130

[56] References Cited

U.S. PATENT DOCUMENTS

| | | | |
|---|---|---|---|
| 4,193,691 | 3/1980 | Fjarlie | 356/330 |
| 4,615,619 | 10/1986 | Fateley | 356/310 |
| 4,799,795 | 1/1989 | Fateley | 356/310 |
| 4,818,867 | 4/1989 | Hayashi et al. | 250/229 |
| 4,887,104 | 12/1989 | Kitano et al. | |
| 5,090,807 | 2/1992 | Tai | 356/330 |
| 5,162,919 | 11/1992 | Ono | |
| 5,414,540 | 5/1995 | Patel et al. | 359/39 |
| 5,457,530 | 10/1995 | Nagai | 356/330 |

FOREIGN PATENT DOCUMENTS

| | | | |
|---|---|---|---|
| 075171 | 3/1983 | European Pat. Off. | 356/330 |

OTHER PUBLICATIONS

Manual for Color Television (TH-29VW10).

*Primary Examiner*—P. L. Evans
*Attorney, Agent, or Firm*—Price, Gess, & Ubell

[57] ABSTRACT

A multi-slit type spectrometer includes a light diffracter which diffracts an incident light according to wavelengths; an optical shutter array member including a plurality of optical shutter elements arranged in correspondence with wavelength bands diffracted by the light diffracter, operable to transmit an incident ray according to an applied voltage, and made of PLZT. A zone of a given number of adjacent optical shutter elements is applied with a voltage corresponding to the wavelength bands of the rays incident upon the zone of adjacent optical shutter elements at a specified timing so that the rays respectively pass through or are reflected at the optical shutter elements. A signal processor receives the ray which has passed through or has been reflected at each optical shutter element and outputs an electrical signal according to the intensity of the received ray. A calculator calculates the intensity of the incident ray for each wavelength band in accordance with the electrical signal output from the signal processor and the specified applying timing.

21 Claims, 27 Drawing Sheets

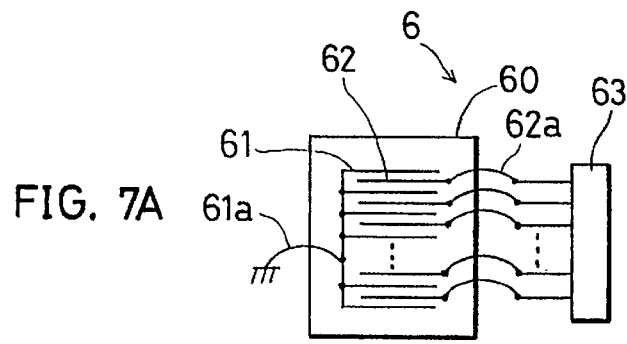
FIG. 7A
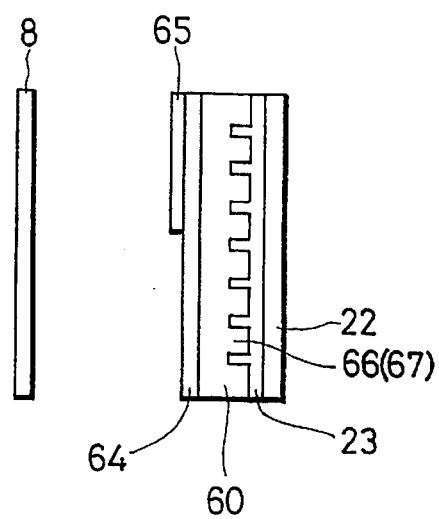
FIG. 7B
FIG. 7C
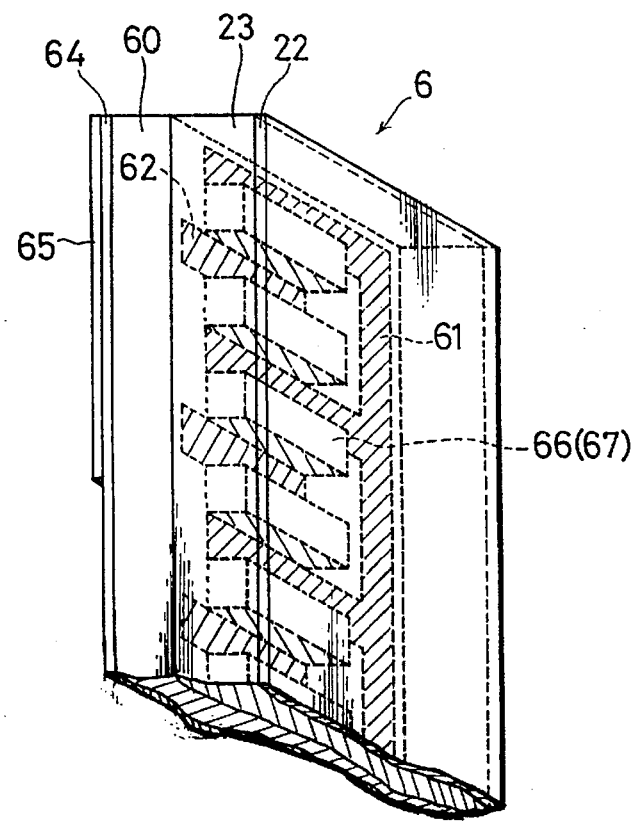

FIG. 13a SAMPLE HOLD SIGNAL 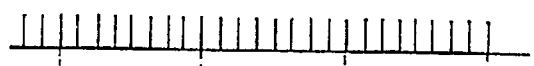
FIG. 13b OUTPUT SIGNAL Di(t)
FIG. 13c OUTPUT SIGNAL Dn(t)
FIG. 13d DETECTOR SIGNAL S(t)
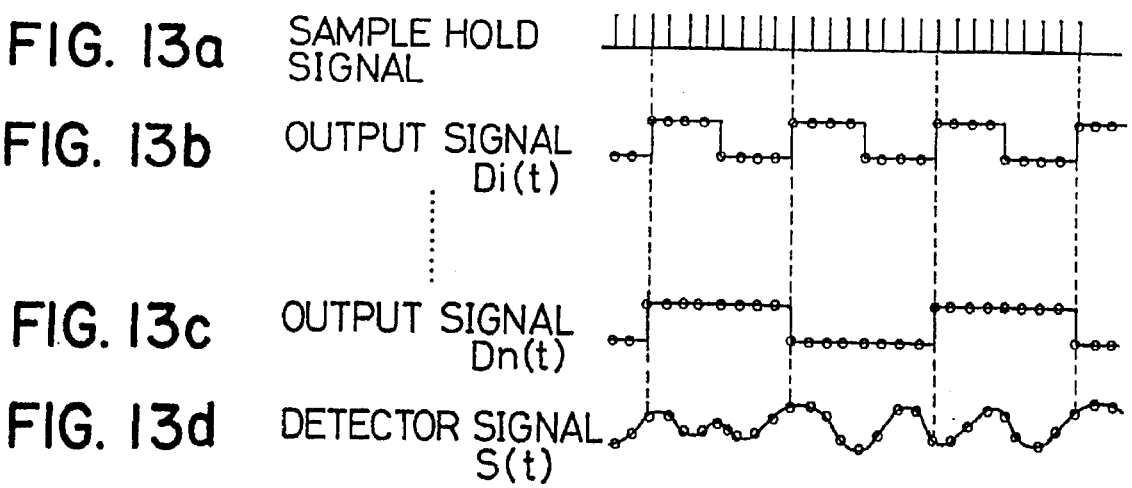
FIG. 14a ORIGINAL OUTPUT SIGNAL 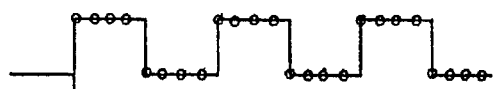
FIG. 14b SHIFTED OUTPUT SIGNAL 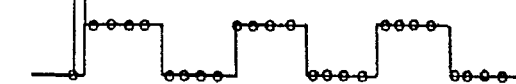

SPECTROMETER PROVIDED WITH AN OPTICAL SHUTTER

This is a divisional application of U.S. Ser. No. 08/518,194, filed on Aug. 23, 1995, now U.S. Pat. No. 5,510,180, which is a continuation-in-part U.S. patent application of U.S. Ser. No. 08/290,231, filed Aug. 15, 1994 now U.S. Pat. No. 5,457,530.

BACKGROUND OF THE INVENTION

1. Field of the Invention

This invention relates to a multi-slit type spectrometer.

2. Description of Prior Art

A lot of attentions have been conventionally given to a non-destructive inspection by use of near infrared spectroscopic analysis. Particularly, there has been a strong demand for an on-line non-destructive inspection in manufacturing industrial products. However, a near infrared spectrometer which is presently in practical use requires a long time for the inspection since a diffraction means such as a diffraction grating is mechanically scanned. This spectrometer is unsuitable to carry out a continuous inspection over a long time since it has a mechanical drive device. In view of this, recently, a multi-slit spectroscopic method has been employed which is suitable to carry out the inspection within a short time has been employed. In order to eliminate the need for the drive device, also, spectrometers have been proposed which have an optical shutter including a multitude of electrically controllable slits.

U.S. Pat. No. 4,193,691 discloses a spectrometer employing a liquid crystal shutter as an optical shutter. In this spectrometer, an incident light is separated into respective wavelength components by diffraction means and a plurality of liquid crystal shutters are arrayed on an imaging plane of a spectrum. The respective wavelength components are modulated with different frequencies by turning on and off the respective liquid crystal shutters. The modulated rays are again concentrated to one beam, which is detected by a detector. An output signal of the detector is demodulated with the same frequencies as the modulation frequencies of the respective wavelength components, and the intensity of each wavelength component is detected.

Further, spectrometers have been proposed which employ an optical shutter array member formed of dichromic material (U.S. Pat. Nos. 4,615,619, 4,799,795, Japanese Examined Patent Publication No. 5-6857). The dichromic material has a property of changing from a transparent state to a light reflecting state when the temperature rises. This property of the dichromic material is used to function as an optical shutter. The temperature of the dichromic material is controlled by turning on and off a current applied to this material.

However, the above liquid crystal shutter has a slow responsiveness because of the property of liquid crystal, and cannot be turned on and off at a high speed. It is also relatively difficult to turn on and off the optical shutter made of dichromic material at a high speed because there is a time delay between an actual temperature rise and the start of application of the current. In addition, it is not easy to control the temperature of the dichromic material.

SUMMARY OF THE INVENTION

It is an object of the invention to provide a spectrometer provided with an optical shutter which has overcome the problems residing in the prior art.

It is another object of the invention to provide a spectrometer provided with an optical shutter which is capable of increasing the switching speed of the optical shutter, thereby enabling a high speed response.

It is another object of the invention to provide a spectrometer provided with an optical shutter which can be produced at a reduced cost.

Accordingly, the present invention is directed to a spectrometer comprising: a light diffracter which diffracts an incident light according to wavelengths; an optical shutter array member including a plurality of optical shutter elements, the optical shutter elements being: arranged in correspondence with wavelength bands diffracted by the light diffracter; operable to transmit or block an incident ray according to an applied voltage; and made of PLZT; a voltage applicator which applies a zone of a given number of adjacent optical shutter elements with a voltage corresponding to the wavelength bands of the rays incident upon the zone of adjacent optical shutter elements at a specified timing so that the rays respectively pass through or are reflected at the optical shutter elements, the application voltages for the zones differing from one another in accordance with wavelengths of rays which are incident upon the zones of optical shutter elements; a signal processor which receives the ray which has passed through or been reflected at each optical shutter element and outputs an electrical signal according to the intensity of the received ray; and a calculator which calculates the intensity of the incident ray for each wavelength band in accordance with the electrical signal output from the signal processor and the specified applying timing.

It may be appreciated to further provide a first condenser for concentrating diffracted rays for specified wavelength bands, and a second condenser for concentrating the ray which has passed through or reflected at the optical shutter element.

The voltage applicator may be constructed by a voltage calculating device which calculates for each zone an application voltage necessary for the corresponding zone of optical shutter elements to respectively transmit the rays having wavelengths which falls in the bands; and a voltage applying device which is in responsive to the voltage calculating device and applies the calculated voltages to the respective zones of optical shutter elements.

Further, the voltage applicator may be provided with a temperature detector which detects the temperature of the optical shutter array member; and the voltage calculating device which calculates an application voltage for each zone in consideration of the detected temperature.

The voltage applicator may be constructed by a voltage applying device which applies the zones of optical shutter elements with their respective corresponding voltages at different applying intervals. The calculator may be constructed by a converter which converts electrical signals from the signal processor to digital data at specified sampling timings; and a light intensity calculating device which calculates the intensity of each ray by Fourier-transforming the digital data.

According to the invention, rays diffracted in a wavelength direction are concentrated for respective specified bands and are caused to be incident upon respective optical shutter elements arrayed in correspondence with the positions of the respective bands. The optical shutter elements are made of PLZT. A zone of a given number of adjacent optical shutter elements is turned on and off by applying a voltage corresponding to the wavelength bands of the rays incident upon the zone of adjacent optical shutter elements at a specified timing, thereby modulating the incident ray to transmit or block the ray. The ray which has passed through or been reflected at the optical shutter is processed to an electrical signal according to the intensity of the ray. The intensity of the incident ray is calculated for each band in accordance with the electrical signal and the on-off timing information of the respective optical shutter element.

Transmission and blockage of incident rays are performed by turning on and off the zones of optical shutter elements made of PLZT having a high electrooptical effect. Accordingly, the transmission and blockage of a given number of incident rays can be switched at a high speed, which thus increases the response speed of a spectrometer.

Also, a zone of adjacent optical shutter elements is turned on and off at the same application voltage. This will simplify the construction of the voltage applicator, and thus remarkably reduce the production costs.

The half-wavelength voltage varies depending upon the temperature of the optical shutter. The applied voltage is controlled to be an optimal voltage in accordance with the temperature of the optical shutter array member which is detected by the temperature detector. Accordingly, the transmission and blockage of incident rays can be performed more accurately.

A plurality of zones of optical shutter elements are applied with respective corresponding voltages at different applying intervals. Processed electrical signal outputs are converted to digital data at specified sampling timings. The digital data are Fourier-transformed to calculate the intensity of the ray for each band. Thus, the intensity of each ray can be calculated at higher speed.

These and other objects, features and advantages of the present invention will become more apparent upon a reading of the following detailed description and accompanying drawings.

BRIEF DESCRIPTION OF THE DRAWINGS

FIGS. 7A, 7B and 7C are diagrams showing a construction of an optical shutter array member of the second spectrometer, FIG. 7A being a front view, FIG. 7B a side view, and FIG. 7C a partially enlarged perspective view;

FIGS. 13a, 13b, 13c and 13d are charts showing a sample hold signal, an output signal from the drive device to an optical shutter element, and an output signal of a detector;

FIGS. 14a and 14b are charts showing an output signal of the drive device and a signal obtained by shifting the signal (a) by a phase ø;

DETAILED DESCRIPTION OF THE PREFERRED EMBODIMENTS OF THE INVENTION

Figure 1:
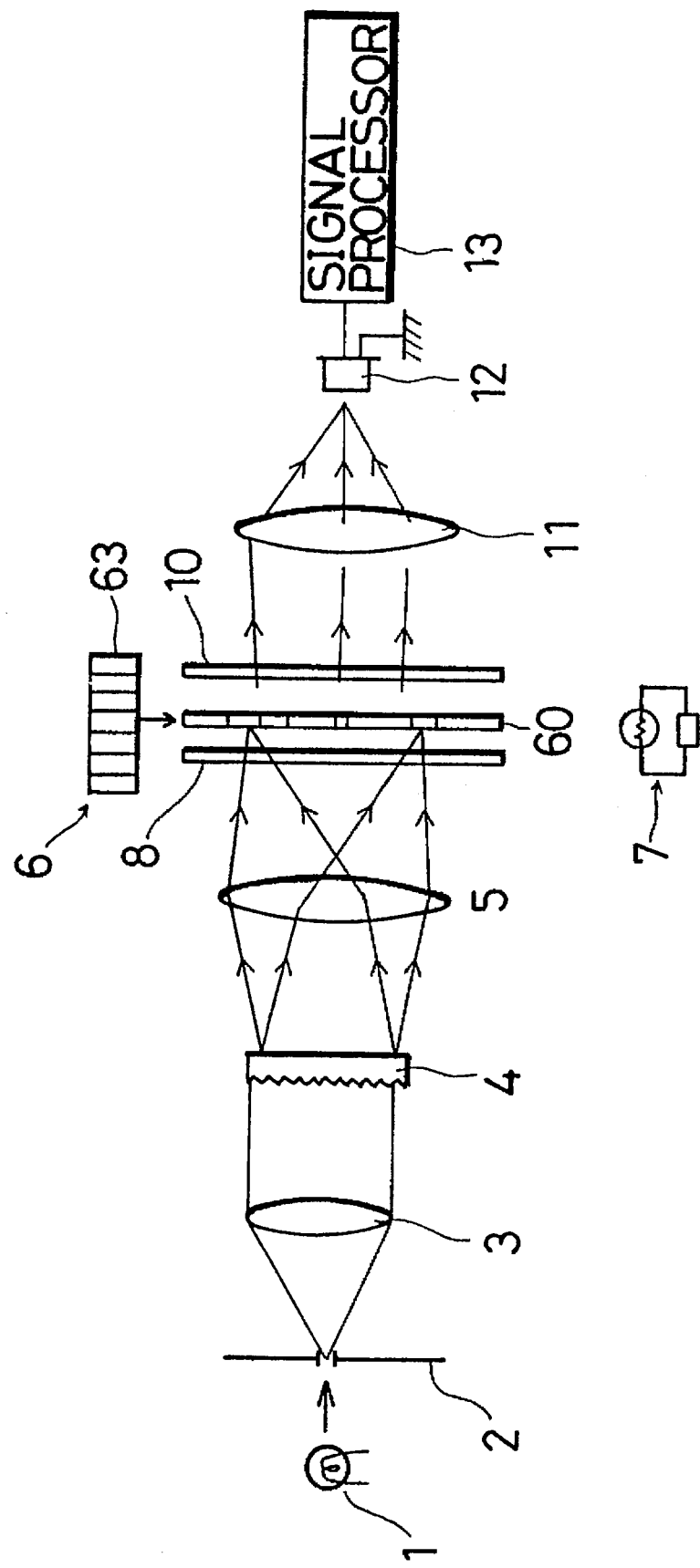
FIG. 1 is a diagram showing a schematic construction of a first spectrometer provided with an optical shutter embodying the invention.

Preferred embodiments of the present invention will be described with reference to the accompanying drawings. It should be noted that throughout the drawings, like reference numerals are given to parts having like functions.

A first spectrometer embodying the invention will be described with reference to FIGS. 1 to 4. FIG. 1 is a diagram showing a schematic construction of the first spectrometer.

A light source 1 is adapted to emit a light to be analyzed by this spectrometer. The light to be analyzed may be a light from the light source itself, or a light from a sample. A slit plate 2 is a nontransparent plate having a narrow slit formed at a given position. The light from the light source 1 is caused to pass through this slit in a planar manner. In the case where a transmittance characteristic or reflection characteristic of a sample is measured, the spectrometer may be constructed such that a light is directed to the sample and the light which has passed through or is reflected by the sample is incident upon the slit plate 2.

A first optical system 3 includes an optical lens or the like, and makes the light which has passed through the slit plate 2 into a parallel light. A diffraction device 4 includes a prism, diffraction grating, or the like, and diffracts the incident parallel light at an angle according to a wavelength. A second optical system 5 concentrates the diffracted rays to an optical shutter to be described for each wavelength.

An optical shutter device 6 includes an optical shutter array member 60, a polarizer 8, an analyzer 10, a drive device 63, etc. and modulates the incident rays for each wavelength. As the polarizer 8 and analyzer 10 are used, for example, a polarizing film made of polyvinyl alcohol and iodine, a wire grid polarizer in which aluminum conductors are drawn in parallel on a substrate such as $CaF_2$, and the like. The polarizer 8 and analyzer 10 transmit only linear polarized components of the incident rays, and are positioned before and after the optical shutter array member 60 with respect to a propagating direction of rays, respectively. Further, they are disposed such that their respective polarizing angles are right angle to each other.

A condenser lens 11 includes an optical lens and concentrates the rays modulated by the optical shutter device 6 on a detector 12. The detector 12 includes a photoelectric conversion element such as a PbS photocell, and outputs an electrical signal representing the intensity of the incident light. A signal processor 13 carries out a signal processing in accordance with the output signal of the detector 12. The operation of the signal processor 13 will be described in more detail later.

Figure 2A:
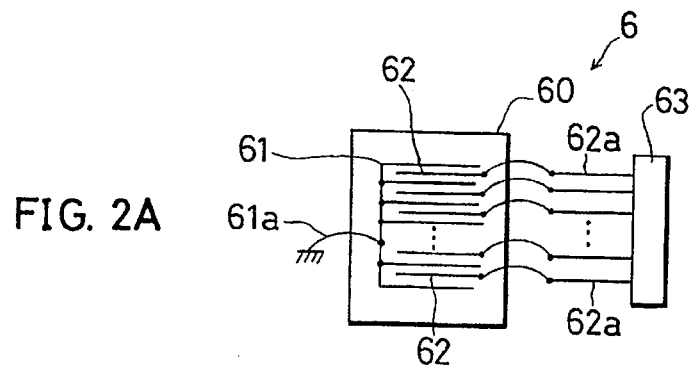
FIGS. 2A, 2B and 2C are diagrams showing a construction of an optical shutter array member of the first spectrometer, FIG. 2A being a front view, FIG. 2B a side view, and FIG. 2C a partially enlarged perspective view.
Figure 2B:
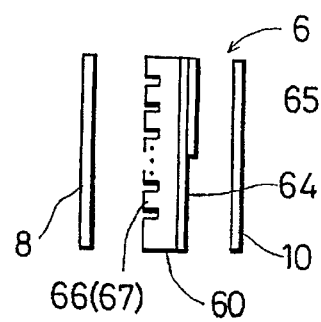
Figure 2C:
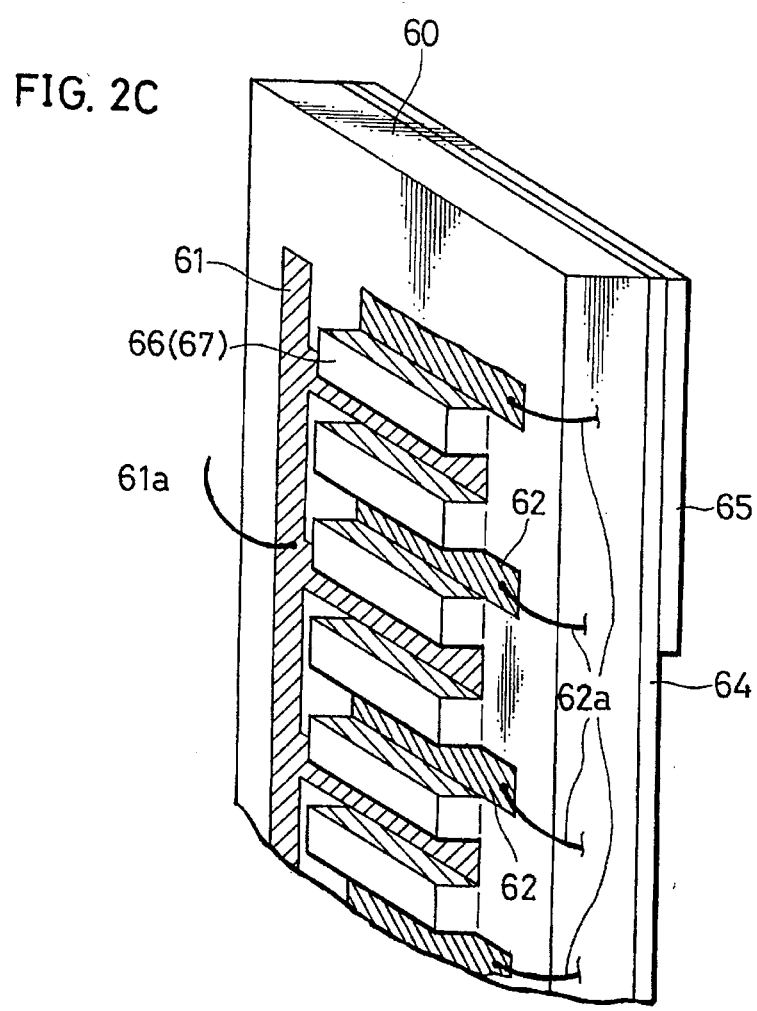
Figure 3:
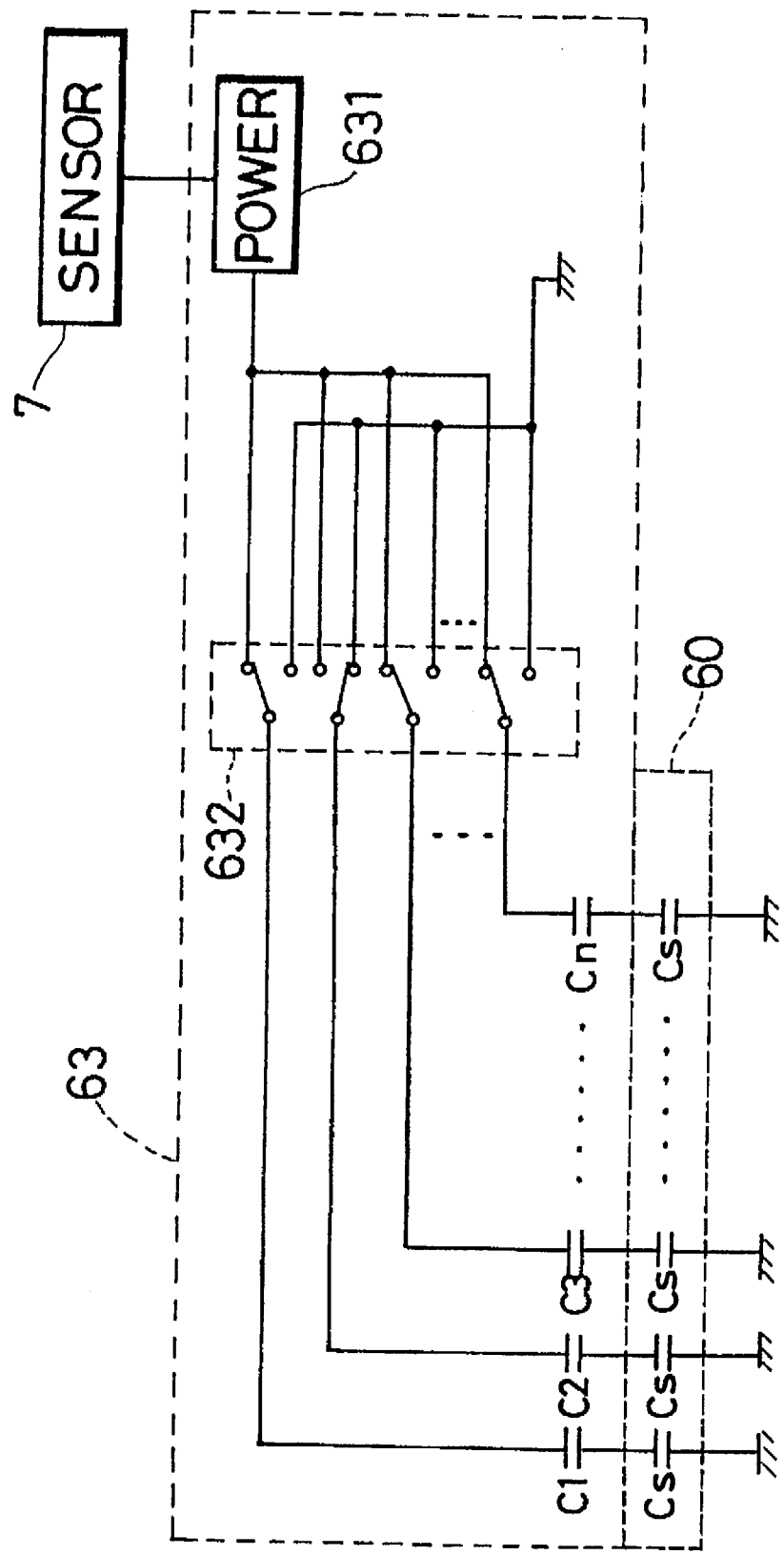
FIG. 3 is a circuit diagram showing an exemplary construction of a drive device of the first spectrometer.

The optical shutter array member 60 is made of material having a large electrooptical effect such as PLZT (lead anthanum zirconate titanate) and has a plate-like shape as shown in FIG. 2.

Figure 28:
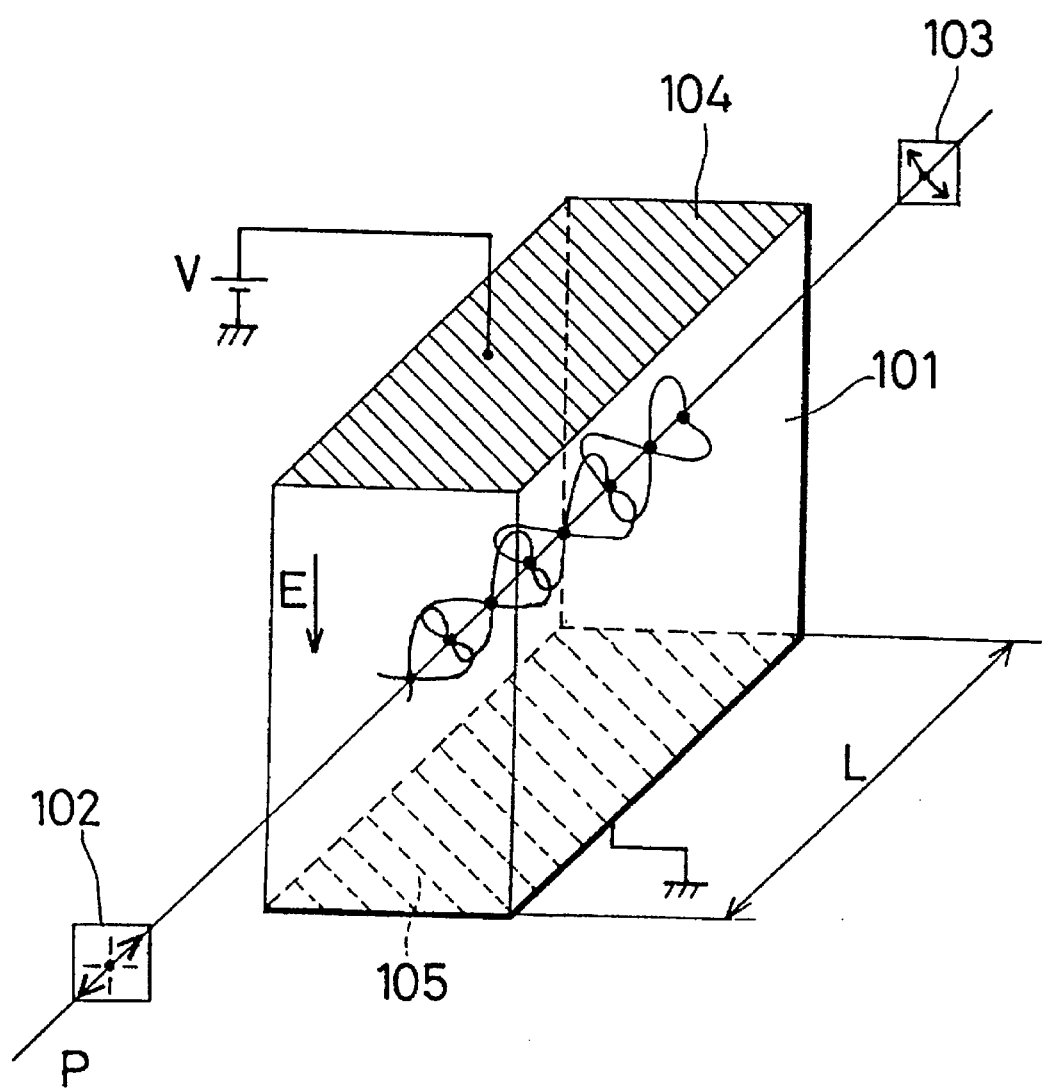
FIG. 28 is a diagram showing the principle of an electrooptical effect.

Next, the principle of an electrooptical effect will be described with reference to FIGS. 28 to 170. FIG. 28 shows an optical arrangement including a medium 101 made of material such as PLZT having a large electrooptical effect, a polarizer 102 and an analyzer 103 positioned before and after the medium 101 on an optical path P of an incident light, respectively. The polarizer 102 and analyzer 103 transmit only linear polarized components of the incident light thereof, and are disposed such that the polarizing angle of the polarizer 102 is right angle to that of the analyzer 103. An electrode 104 is connected to a power supply V via an unillustrated switch device and an electrode 105 is connected to a ground, so that a voltage can be applied to the medium 101.

In a state where no voltage is applied, the medium 101 is optically isotropic, thus the linear polarization light incident thereon is not subject to any change while passing through the medium 101. Since the analyzer 103 is disposed in a position orthogonal to the polarizer 102, the light is blocked by the analyzer 103 and therefore does not pass therethrough.

When a voltage is applied between the electrodes 104 and 105, the index of refraction changes in a direction normal to the one parallel with an electric field E, i.e., the birefringence occurs. When the medium 101 takes on the Kerr effect which is one type of the electrooptical effects, the index of birefringence Δn is expressed as in the following equation (1).

$$\Delta n = -n^3 \cdot R \cdot E^2 / 2 \tag{1}$$

where n denotes an index of refraction of the medium 101, E an electric field, and R a Kerr constant of the medium 101.

When the light passes through the medium displaying the birefringence, a phase difference arises between ordinary rays and extraordinary rays. This phase difference Γ is expressed as in the following equation (2).

$$\Gamma = \Delta n \cdot L \cdot 2\pi / \lambda \tag{2}$$

where L denotes a length of an optical path and λ a wavelength. When the phase difference Γ becomes 180 degrees, the polarized direction of the linear polarization light rotates by 90 degrees. In order to make the phase difference Γ greater, the index of birefringence Δn or the length of the optical path L may be made greater as is clear from the equation (2). In order to make greater the index of birefringence of the medium displaying the electrooptical effect, the applied voltage may be increased.

The light having components in a polarization direction of the analyzer 103 and an intensity expressed in the following equation (3) passes through the analyzer 103.

$$\begin{aligned} Io &= T \cdot Ii \cdot \sin^2(\Gamma/2) \\ &= T \cdot Ii \cdot \sin^2(\Delta n \cdot L \cdot \pi/\lambda) \end{aligned} \tag{3}$$

where Io denotes an intensity of the passed light coming out of the analyzer 103, Ii an intensity of the incident light coming into the polarizer 102, λ a wavelength, T a transmittance of this optical arrangement when the analyzer 103 and the entire medium 101 are in parallel relationship as in the Nicol prism.

Figure 29:
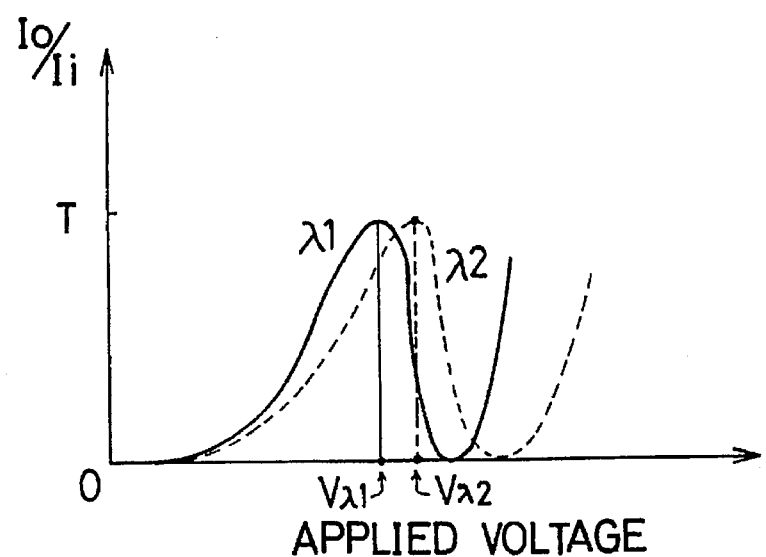
FIG. 29 is a graph showing a characteristic of transmittance of an optical shutter device having an electrooptical effect material in relation to an applied voltage.

As seen from the equations (1) and (2), the phase difference changes when the applied voltage from the power supply V is changed. Accordingly, the transmittance of this optical arrangement, that is, Io/Ii, changes with the change in the applied voltage. FIG. 29 is a graph showing the transmittance of this optical arrangement in relation to the applied voltage. Since the analyzer 103 and polarizer 102 are in orthogonal relationship, the transmittance is at maximum when the phase difference is half the wavelength. Here, a voltage which causes a phase difference corresponding to half the wavelength is referred to as a half-wavelength voltage (indicated by Vλ1, Vλ2 in FIG. 29) for the sake of convenience.

Figure 30:
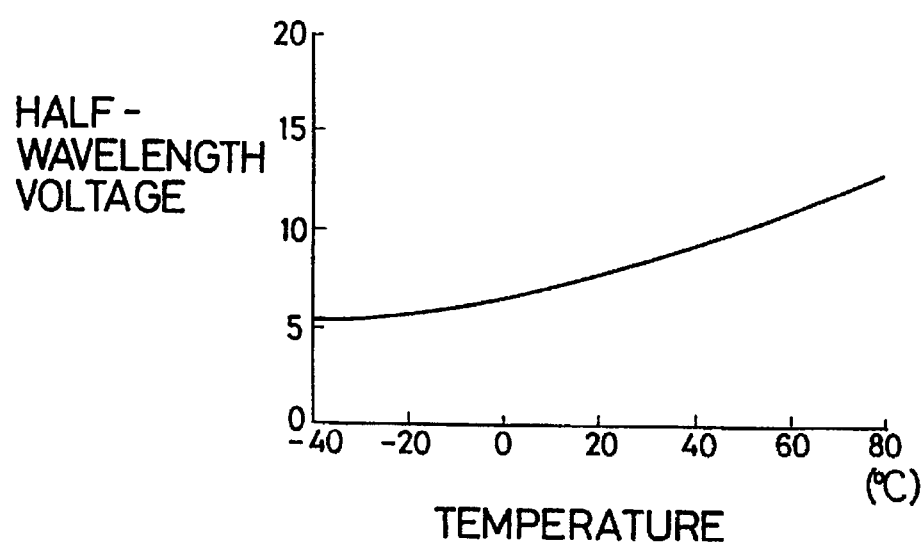
FIG. 30 is a graph showing a characteristic of a half-wavelength voltage in relation to a temperature of an electrooptical effect material of PLZT.

Also, the half-wavelength voltage varies depending upon the temperature of the medium 101. FIG. 30 shows a relationship between the half-wavelength voltage and the temperature of the medium of PLZT. Accordingly, the applied voltage should be controlled to be an optimal voltage in accordance with the temperature of the medium 101, i.e., to be a half-wavelength voltage.

Referring now to FIGS. 2A to 3C, the array member 60 is formed with a plurality of projections 66 in the form of a laterally long rectangular parallelepiped on a light incident side thereof. In recesses formed between projections 66 are alternately formed a common electrode 61 and individual electrodes 62 (hatched portions in FIG. 2C) by means of the deposition or the like. Specifically, each individual electrode 62 is positioned between teeth of the comb-shaped common electrode 61.

The common electrode 61 is connected to a ground via a lead wire 61a, and the individual electrodes 62 are connected to the drive device 63 via lead wires 62a, respectively. An optical shutter element 67 is formed on each projection 66 between the tooth of the common electrode 61 and its corresponding individual electrode 62. When a voltage is applied to the projection 66 by the electrodes 61 and 62, the corresponding optical shutter element 67 is turned on, and the ray consequently transmits through the analyzer 10. On the other hand, when no voltage is applied, the element 67 is turned off, and the ray is consequently blocked by the analyzer 10.

The optical path of the light passing through the optical shutter array member 60 is lengthened by the presence of the projection 66. Thus, it is possible to cause a large phase difference in the transmitted light with a small applied voltage as seen from the equation (2).

Reflection preventing film 64 is provided on the optical shutter array member 60. The film 64 is made of a coating material to reduce the reflection, and is formed on the surface of the optical shutter array member 60 by means of the deposition. Materials having a large electrooptical effect such as PLZT have a high index of refraction, and have a high reflectance and a low transmittance. Accordingly, the film 64 is provided to improve the transmittance of the optical shutter array member 60 by reducing the reflection.

A high-order diffracted ray blocking filter 65 is formed by means of the deposition at a part of a rear surface of the optical shutter array member 60 where the rays having long wavelengths come out and block high-order diffracted rays produced by the diffraction device 4. In the case where a first order diffracted ray having a wavelength of λ is diffracted in a certain direction by the diffraction grating constituting the diffraction device 4, a second order diffracted ray having a wavelength of λ/2 and a third order diffracted ray having a wavelength of λ/3 are also diffracted in the same direction. Hence, high-order diffracted rays as well as the rays having a predetermined wavelength pass through the respective optical shutter elements 67.

Thus, these high-order diffracted rays are blocked by the filter 65, so that only the first order diffracted ray can be measured.

The dimensions of the filter 65 are determined by a measurable wavelength range of this spectrometer. For example, if this range is between 1 and 4 μm, the second order diffracted rays having a wavelength of 1 to 2 μm are incident on the optical shutter on which the first order diffracted rays having a wavelength of 2 to 4 μm concentrate. Further, the third order diffracted rays having a wavelength of 1 to 4/3 μm are incident on the optical shutter on which the first order diffracted rays having a wavelength of 3 to 4 μm concentrate. In this case, such a high-order diffracted ray blocking filter 65 as to block the rays having a wavelength of shorter than 2 μm may be formed in a region covering the optical shutter element 67 to which the first order diffracted rays having a wavelength of 2 to 4 μm concentrate.

For example, in the case of blocking rays having a wavelength of 1 μm or shorter, the filter 65 may be made of silicon, or the like. It may also appropriate to form by means of the deposition a multi-layer film made of dielectric substance such as zinc sulfide and magnesium fluoride to transmit the rays whose wavelength falls within a set wavelength range and reflect the rays having the wavelengths of the high-order diffracted rays.

It is designed to improve the spectral sensitivity or performance by the reflection preventing film 64 and the high-order diffracted ray blocking filter 65.

The drive device 63 is an electrical circuit which includes a power supply unit 631, a switch unit 632, etc. and is constructed such that desired voltages are applied to the respective individual electrodes 62 via capacitors C1 to Cn.

Since the optical shutter element 67 is formed of a dielectric material, it is equivalent to a capacitor in an electric circuit. Accordingly, a voltage obtained by dividing a supply voltage by the respective optical shutter elements 67 and the capacitors C1 to Cn is applied to the respective individual electrodes 62.

Rays having different wavelengths are incident on the respective optical shutter elements 67. The capacity of the respective capacitors C1 to Cn is selected such that the voltage applied to the optical shutter element 67 is an optimal voltage for the wavelength of the ray incident on this element 67, i.e., a half-wavelength voltage. Each optical shutter element 67 transmits a maximal amount of rays when it is turned on, i.e., a voltage is applied.

A temperature sensor 7 includes a thermistor and is disposed in proximity to the optical shutter array member 60 for detecting the temperature of the array member 60. As shown in FIG. 30, the property of the optical shutter array member 60 is such that the half-wavelength voltage changes as the temperature changes. Thus, the power supply unit 631 is provided with a correcting circuit for correcting the voltage applied to the optical shutter element 67 to the half-wavelength voltage in accordance with the detected temperature from the temperature sensor 7.

Although the voltages are applied to the respective optical shutter elements 67 via the capacitors C1 to Cn in this embodiment, the half-wavelength voltages may be applied individually and directly to these elements 67.

Figure 4:
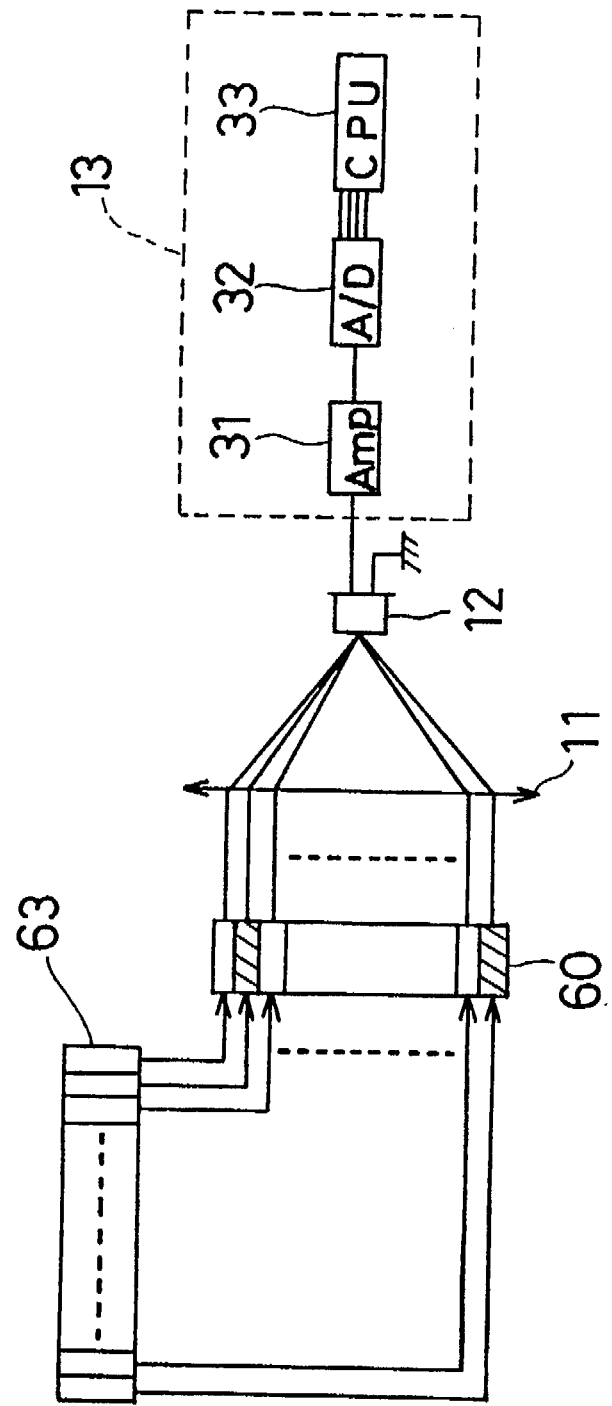
FIG. 4 is a circuit diagram showing a signal processor of the first spectrometer.
Figure 5A:
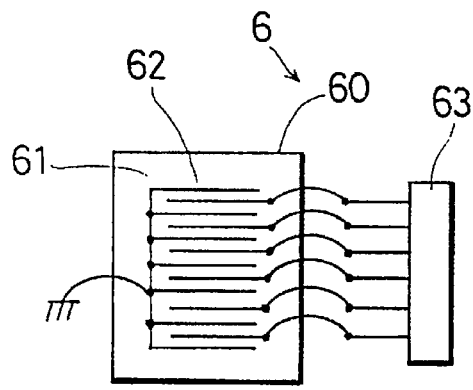
FIGS. 5A, 5B and 5C are diagrams showing a construction of a modification of the optical shutter array member of the first spectrometer, FIG. 5A being a front view, FIG. 5B a side view, and FIG. 5C a partially enlarged perspective view.
Figure 5B:
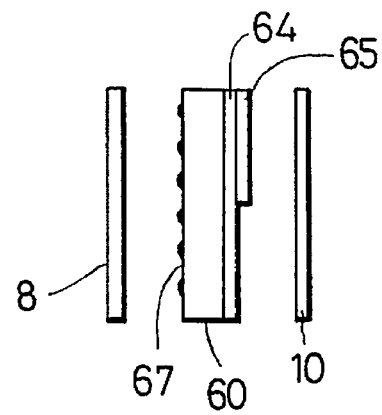
Figure 5C:
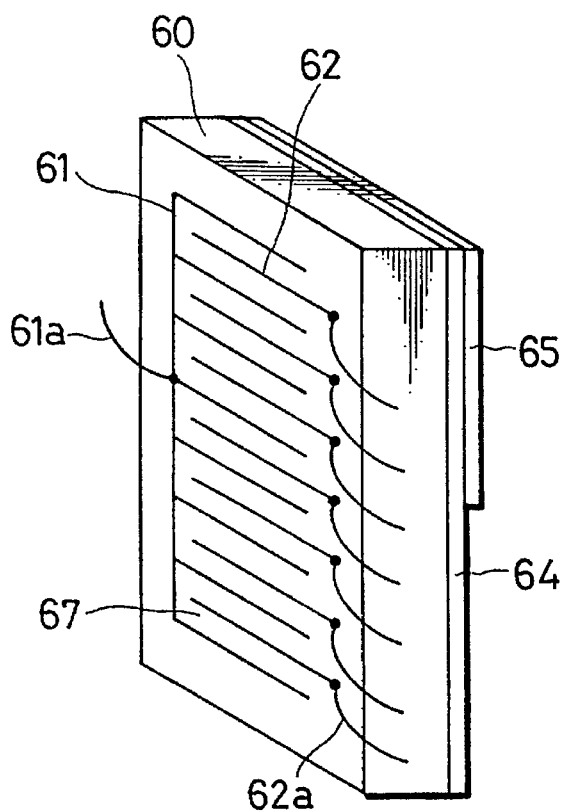

The signal processor 13 will be next described with reference to FIG. 4. FIG. 4 is a diagram showing a schematic construction of a drive system for the optical shutter array member 60 and the signal processor 13. In the first embodiment, the Hadamard's transform spectral method is employed and the optical shutter array member 60 includes optical shutter elements 67. In this case, the number of the optical shutter elements 67 is N.

The signal processor 13 includes an amplifier 31, an analog-digital (A/D) converter 32, a CPU 33, and the like. The amplifier 31 amplifies an output signal of the detector 12. The A/D converter 32 converts the amplified output signal into a digital value. The CPU 33 calculates the intensity of the incident light for each wavelength in accordance with the Hadamard's transform spectral method. Next, a measurement in accordance with the Hadamard's transform spectral method will be described. In the case where measurements are made M times by changing the on-off pattern of the respective optical shutter elements 67, an output signal Xi (i=1, 2, . . . , M) of the detector 12 in the i-th measurement is expressed in the following equation (4).

$$Xi = \sum_{j=1}^{n} W_{ij} Y_j \quad (i=1,2,\ldots,M) \tag{4}$$

where Wij denotes a factor indicating whether an optical shutter element in the j-th position is open or closed during the i-th measurement and is expressed as shown in the following equation (5), and Yj denotes an intensity of a ray incident upon the j-th optical shutter element.

$$Wij = \begin{cases} 1 & \text{(open)} \\ 0 & \text{(closed)} \end{cases} \quad (5)$$

The equation (4) is expressed as shown in the following equation (6), using a matrix [Wij] and row vectors {Xi}, {Yj}.

$$\{Xi\} = \{Yj\} [Wji] \quad (6)$$

Thus, a spectral intensity of each optical shutter element, i.e., each wavelength can be calculated using the following equation (7). At this time, the matrix [Wij] which makes measurement error smallest can be derived using the Hadamard's matrix.

$$\{Yj\} = \begin{cases} \{Xi\} [Wji]^{-1} & (M = N) \\ \{Xi\} [Wij] ([Wji] [Wij])^{-1} & (M > N) \end{cases} \quad (7)$$

The optical shutter array member 60 may have the shape of a rectangular parallelepiped, and the comb-shaped common electrode 61 and the individual electrodes 62 may be arranged on the surface of the array member 60, each individual electrode 62 being located between two neighboring teeth of the common electrode 61, so that an optical shutter element 67 is formed between an individual electrode 67 and its corresponding tooth of the common electrode 61. In this way, the optical shutter array member 60 can be formed easily.

Figure 6:
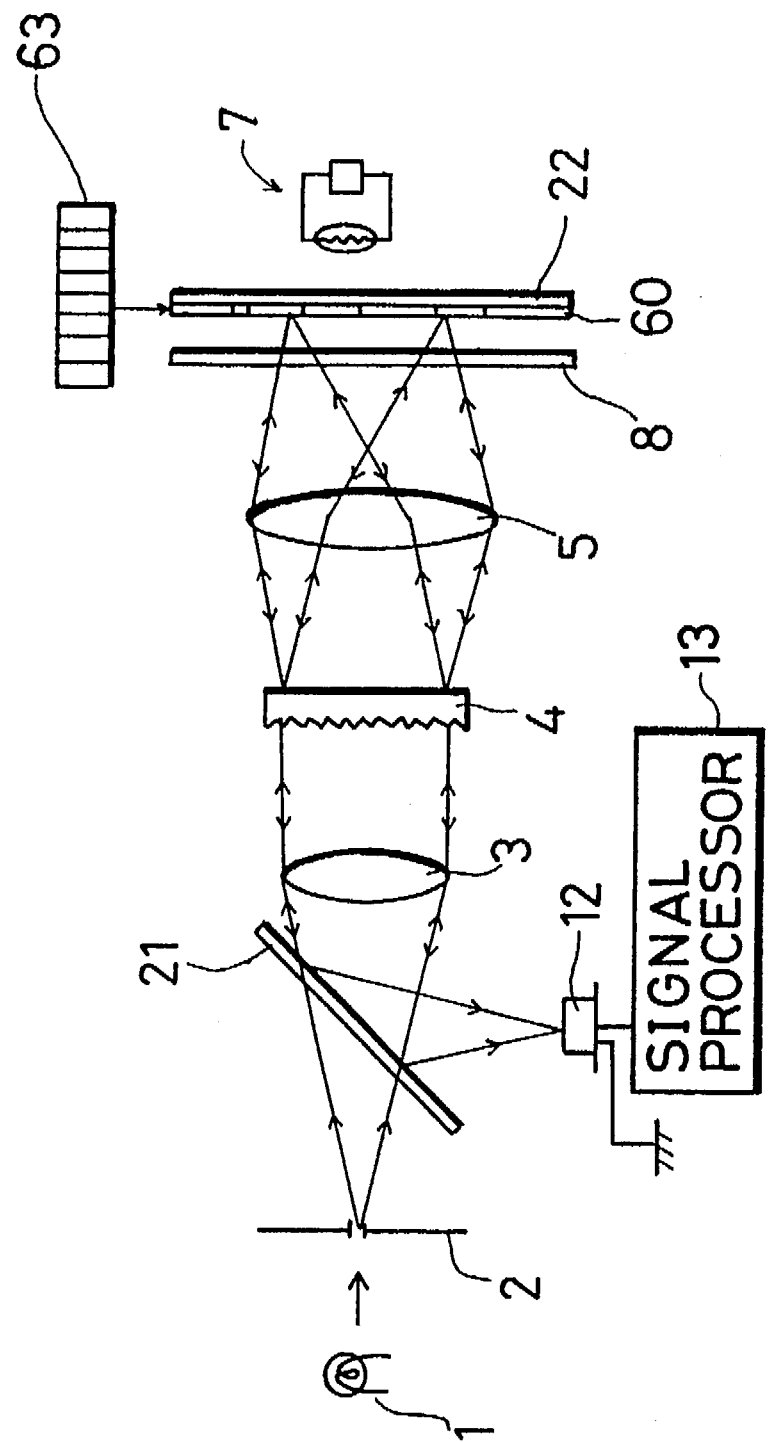
FIG. 6 is a diagram showing a schematic construction of a second spectrometer embodying the invention.

A second spectrometer provided with an optical shutter will be described next with reference to FIGS. 6 to 7C. FIG. 6 is a diagram showing a schematic construction of a second spectrometer embodying the invention, and FIGS. 7A, 7B and 7C are front, side and partially enlarged perspective views respectively showing a construction of an optical shutter array member 60 of the second spectrometer.

The second spectrometer employs a reflection type optical system, thereby shortening the length of the optical system and, for that matter, making the apparatus itself smaller.

A semitransparent mirror 21 is disposed between a slit plate 2 and a first optical system 3. This mirror 21 transmits the light from the slit plate 2 and reflects the light concentrated by the first optical system 3 to focus the same on a detector 12.

An optical shutter array member 60 is made of PLZT or like material having a large electrooptical effect and has a plate-like shape as shown in FIGS. 7A to 7C. The optical shutter array member 60 is formed with a plurality of projections 66 in the form of a laterally long rectangular parallelepiped at its downstream side surface with respect to its optical path. In recesses formed between projections 66, there are alternately formed a common electrode 61 and individual electrodes 62 (hatched portions in FIG. 7C) by means of the deposition or the like. Specifically, each individual electrode 62 is positioned between teeth of the comb-shaped common electrode 61.

The common electrode 61 is connected to a ground via a lead wire 61a, and the individual electrodes 62 are connected to a drive device 63 via lead wires 62a, respectively. An optical shutter element 67 is formed on each projection 66 between the tooth of the common electrode 61 and its corresponding individual electrode 62. When a voltage is applied to the projection 66 by the electrodes 61 and 62, the corresponding optical shutter element 67 is turned on. When no voltage is applied, the element 67 is turned off.

The optical path of the light passing through the optical shutter array member 60 is lengthened by the presence of the projection 66. Thus, it is possible to cause a large phase difference in the transmitted light with a small applied voltage.

The projections 66, electrodes 61 and 62 are covered with an insulation film 23. The film 23 serves as an insulator lest the electrodes 61 and 62 should be short-circuited by the presence of a reflection mirror 22 and made of material which permits light to pass therethrough and insulates electricity. The reflection mirror 22 reflects the light passing through the optical shutter array member 60 and is formed by depositing a metal or the like on the surface of the insulation film 23.

A polarizer 8 is disposed on an incident side of the optical shutter array member 60. Since the light which has passed through the array member 60 is reflected by the reflection mirror 22 and passes back and forth through the array member 60, the length of the optical path is doubled. Thus, a half-wavelength voltage can be half as high as the one used for the aforementioned transmission type optical shutter array member. The polarizer 8 serves also as an analyzer. In the reflection type optical shutter array member, the optical shutter elements 67 transmit the light when no voltage is applied, while blocking the light when the half-wavelength voltage is applied.

In the case where the reflection mirror 22 is inclined in the depth direction of the surface of FIG. 6, i.e., the insulation film 23 is formed such that its thickness vary in the depth direction in FIG. 7B, the detector 12 may be disposed at a position before or beside the slit plate 2 in the depth direction of the surface of FIG. 6. This arrangement obviates the need for the semitransparent mirror 21.

Figure 8A:
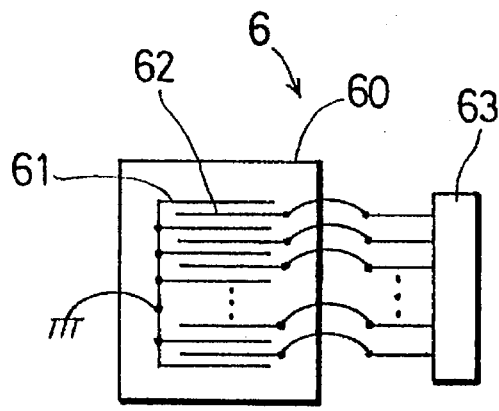
FIGS. 8A, 8B and 8C are diagrams showing a construction of a modification of the optical shutter array member of the second spectrometer, FIG. 8A being a front view, FIG. 8B a side view, and FIG. 8C a partially enlarged perspective view.
Figure 8B:
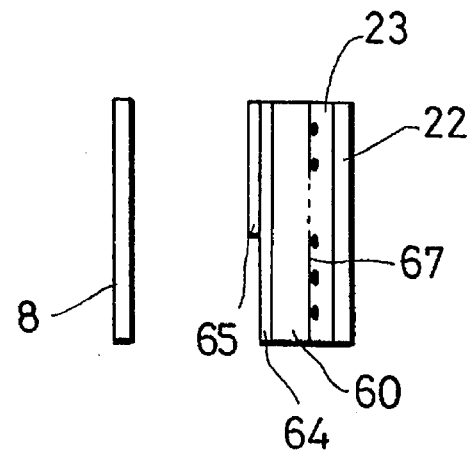
Figure 8C:
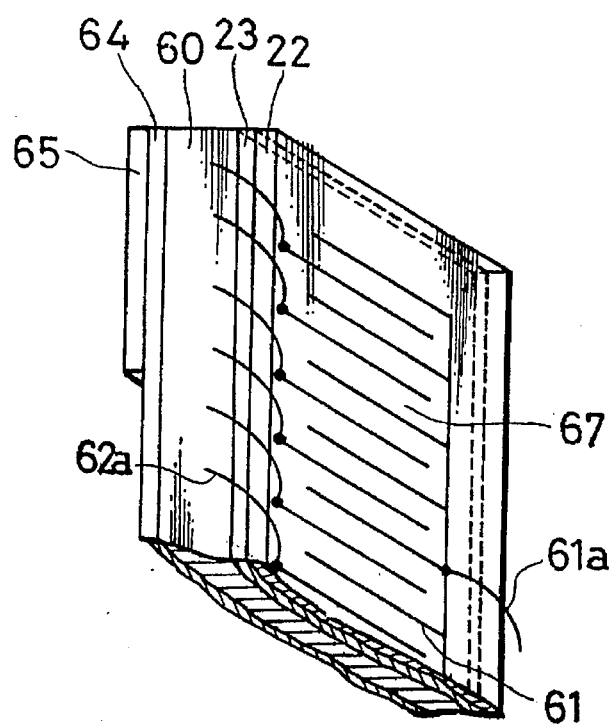

As shown in FIGS. 8A to 8C, also, the optical shutter array member 60 may have the shape of a rectangular parallelepiped, and the comb-shaped common electrode 61 and the individual electrodes 62 may be arranged on the surface of the array member 60, each individual electrode 62 being located between two neighboring teeth of the common electrode 61, so that an optical shutter element 67 is formed between an individual electrode 62 and its corresponding tooth of the common electrode 61. In this way, the optical shutter array member 60 can be formed easily.

Figure 9:
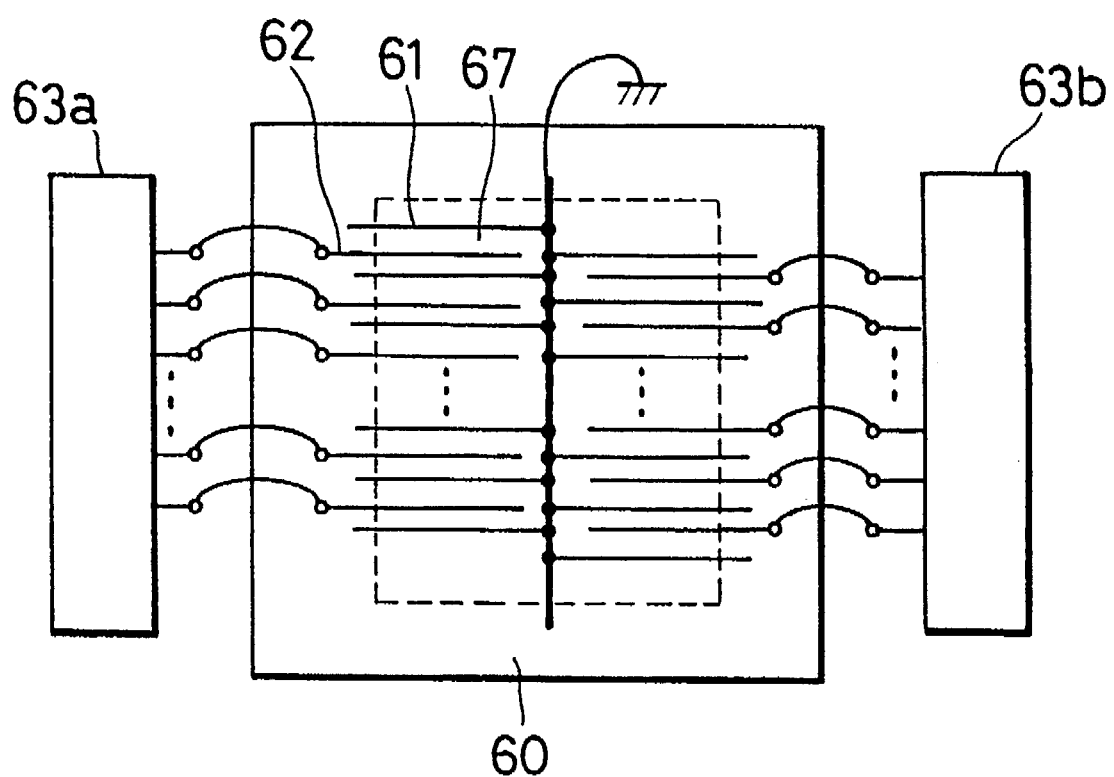
FIG. 9 is a front view showing a construction of an optical shutter array member of a third spectrometer embodying the invention.

A third spectrometer of the invention will be described next with reference to FIG. 9. The third spectrometer basically has the same construction as the first spectrometer except an optical shutter. FIG. 9 is a front view showing a construction of an optical shutter of the third spectrometer.

In the third spectrometer, the optical shutter array member 60 is so constructed as to improve the resolving power. Specifically, as shown in FIG. 9, a common electrode 61 has an earth line at the center and two groups of teeth extending from the earth line in opposite directions. One tooth of one group is shifted by half the pitch from the corresponding tooth of the other group. Each individual electrode 62 is arranged between two neighboring teeth of the same group of the common electrode 61. The individual electrodes 62 at the left side in FIG. 9 are connected to a drive device 63a, while those at the right side are connected to a drive device 63b.

With this construction, the pitch of an optical shutter element 67 can be narrowed to one half of the narrowest possible pitch. Thus, the spectrum resolving power can be doubled.

Figure 10:
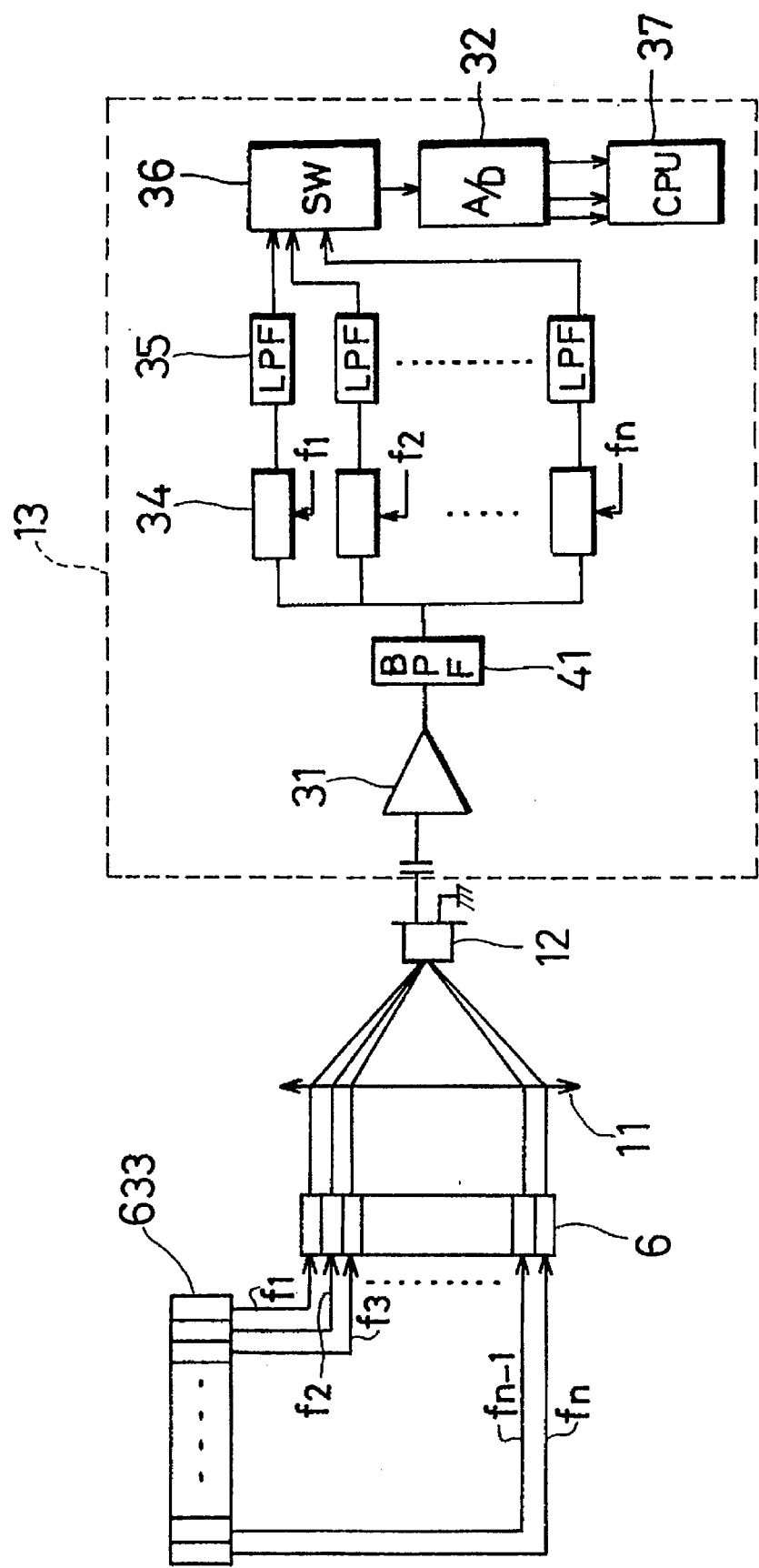
FIG. 10 is a circuit diagram showing a signal processor of a fourth spectrometer embodying the invention.

A fourth spectrometer provided with an optical shutter will be described with reference to FIG. 10. FIG. 10 is a circuit diagram showing a drive system and a signal processor 13 of the fourth spectrometer.

In the fourth spectrometer, the optical shutter array member 60 includes n optical shutter elements and a drive device 633 applies a voltage to the i-th optical shutter element by outputting a voltage pulse having a frequency fi (where i=1, 2, . . . , n) to the i-th lead wire.

The signal processor 13 includes an amplifier 31, a band pass filter (BPF) 41, a synchronization detector 34, a smoothing circuit 35, an analog switch 36, an A/D converter 32, a CPU 37 and the like. There are n synchronization detectors 34 arranged in series to which an output from the amplifier 31 is fed. The i-th synchronization detector 34 synchronously detects the signal detected by the detector 12 with the frequency fi. The smoothing circuit 35 smooths the respective detected signals. The analog switch 36 outputs the smoothed signals sequentially to the A/D converter 32. The converter 32 converts into a digital value the received signal which is detected with the frequency fi and smoothed via a line corresponding to the frequency fi, and outputs it to the CPU 37. The CPU 37 calculates the intensity of the ray which has passed through the i-th optical shutter element, i.e., the intensity of the light for each wavelength.

Figure 11:
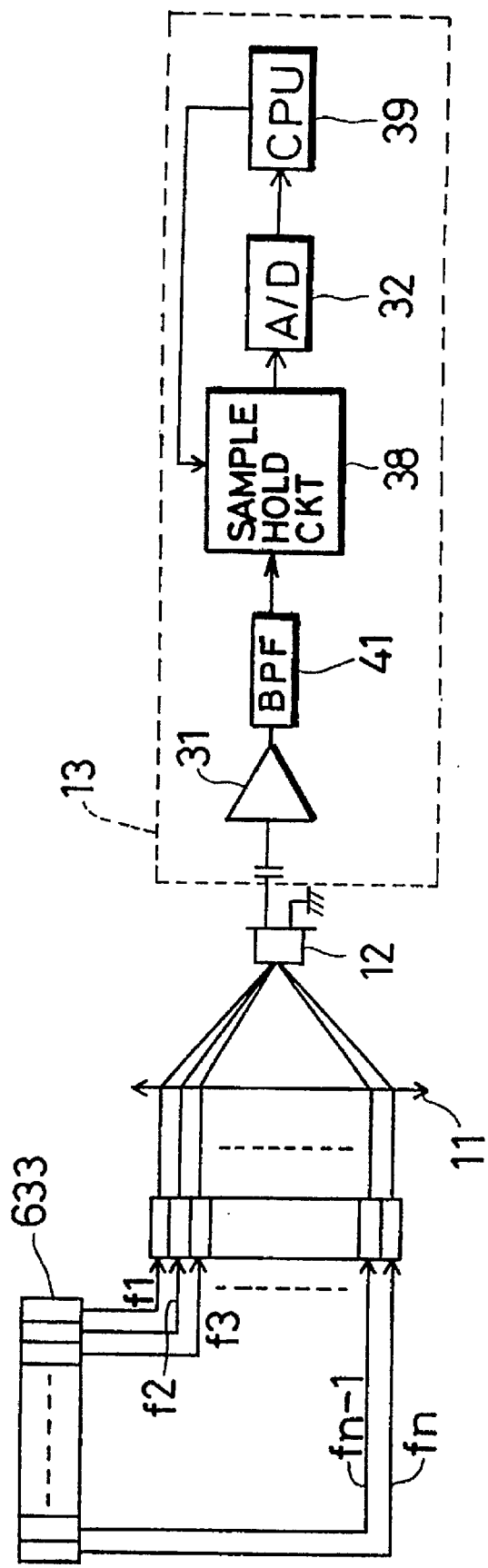
FIG. 11 is a circuit diagram showing a signal processor of a fifth spectrometer embodying the invention.

A fifth spectrometer provided with an optical shutter will be described next with reference to FIG. 11. FIG. 11 is a schematic construction diagram showing a drive system and a signal processor 13 for an optical shutter array member 60 of the fifth spectrometer.

A sample hold circuit 38 holds only for a time T a signal which is detected by a detector 12 in accordance with a sampling pulse having a period T from a CPU 39 and input to the circuit 38 by way of an amplifier 31. An A/D converter 32 converts the signal held by the circuit 38 into a digital value, which is then fed to the CPU 39. The CPU 39 Fourier-transforms the received digital value and calculates the magnitude of the signal modulated with the frequency fi. In this way, the intensity of the ray which has passed through the i-th optical shutter element, i.e., the intensity of the light for each wavelength can be calculated.

Figure 12:
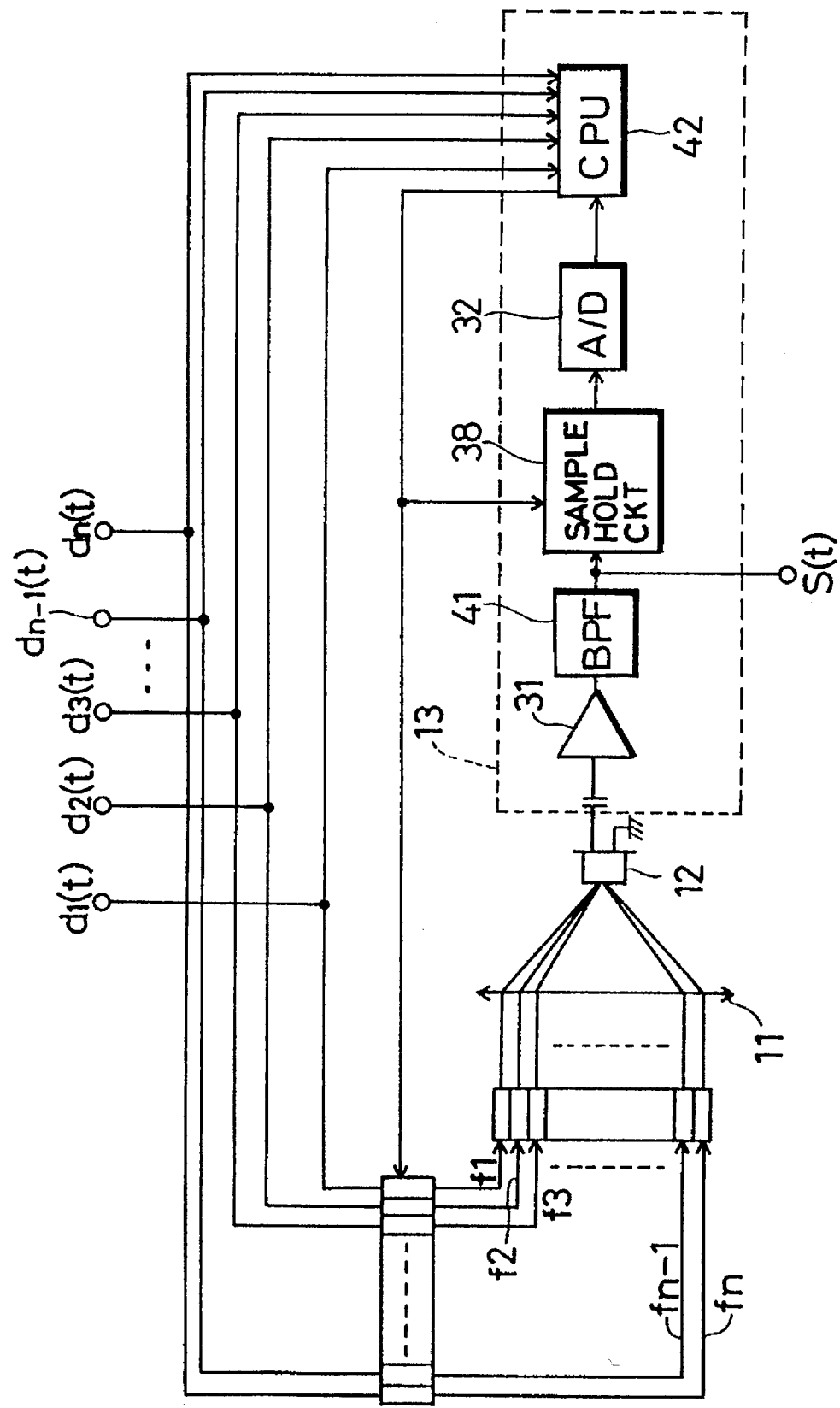
FIG. 12 is a circuit diagram showing a signal processor of a sixth spectrometer embodying the invention.

A sixth spectrometer provided with an optical shutter will be described next with reference to FIGS. 12 to 14. FIG. 12 is a schematic construction diagram showing a drive system and a signal processor 13 for an optical shutter array member 60 of the sixth spectrometer.

In the sixth spectrometer, the optical shutter array member 60 includes n optical shutter elements. The signal processor 13 includes an amplifier 31, a BPF 41, a sample hold circuit 38, an A/D converter 32, a CPU 42, and the like. A drive device 634 outputs to the i-th lead wire a voltage signal Di(t) having a frequency fi (where i=1, 2, . . . , n) as shown in FIG. 13 to thereby apply a voltage to the i-th optical shutter element, and sends an information as to whether the output signal Di(t) thereof is on or off in synchronism with a sampling pulse.

The BPF 41 is a filter for transmitting signal components in a frequency band between f1 and fn. The sample hold circuit 38 holds only for a time T a signal which is detected by a detector 12 in accordance with a sampling pulse having a period T, as shown in FIG. 13, from the CPU 42 and input to the circuit 38 by way of the amplifier 31 and BPF 41. The A/D converter 32 converts the analog signal held by the circuit 38 into a digital value, which is then fed to the CPU 42. The CPU 42 calculates the magnitude of the signal modulated with the frequency fi from the received digital value, and calculates the intensity of the ray which has passed through the i-th optical shutter element, i.e., the intensity of the light for each wavelength. The intensity of the ray which has passed through the i-th optical shutter element is calculated in accordance with the following equation (8). It should be noted that m is a value corresponding to a time constant.

$$Ii = \sum_{j=1}^{m} S(tj) \cdot Di(tj) \quad (8)$$

$$Di(t) = \begin{cases} 1 & (i\text{-th element is on}) \\ -1 & (i\text{-th element is off}) \end{cases}$$

In the case where the phase of the output signal of the detector 12 is shifted by $\phi$ in the amplifier 31 and BPF 41, the CPU 42 may receive the output signal Di(t) of the drive device 634 while shifting the phase thereof by $\phi$ as shown in FIG. 14.

By performing the synchronization detection equivalently using a digital value, it becomes unnecessary to provide the synchronization detector as many as wavelengths to be measured, i.e., as many as the optical shutter elements, with the result that the number of parts can be greatly reduced. Since the operation of the CPU 42 is basically only the addition and subtraction as seen from the equation (8), the CPU 42 can perform the operation rapidly.

As described above, according to the invention, rays diffracted in a wavelength direction are concentrated for respective specified bands and are caused to be incident upon respective optical shutter elements arrayed in correspondence with the positions of the respective bands. Each optical shutter element is turned on and off by applying a voltage corresponding to the band of the incident ray at a given timing. The rays which have passed through the optical shutters are again concentrated and an electrical signal according to the intensity of this transmitted light is detected. The intensity of the incident ray is calculated for each band in accordance with the detected electrical signal and the on-off information of the respective optical shutter elements. Further, the applied voltage is controlled based on the temperature of the optical shutter so that it will be at an optimal level. Thus, the use of an optical shutter having a high response speed leads to realization of a high performance spectrometer capable of responding at a high speed.

Next, a seventh spectrometer of the invention will be described with reference to FIGS. 15 and 16. The seventh spectrometer basically has the same construction as the first spectrometer shown in FIG. 1 in the case of transmitting incident rays and the same construction as the second spectrometer shown in FIG. 6 in the case of reflecting incident rays except an optical shutter.

Figure 15:
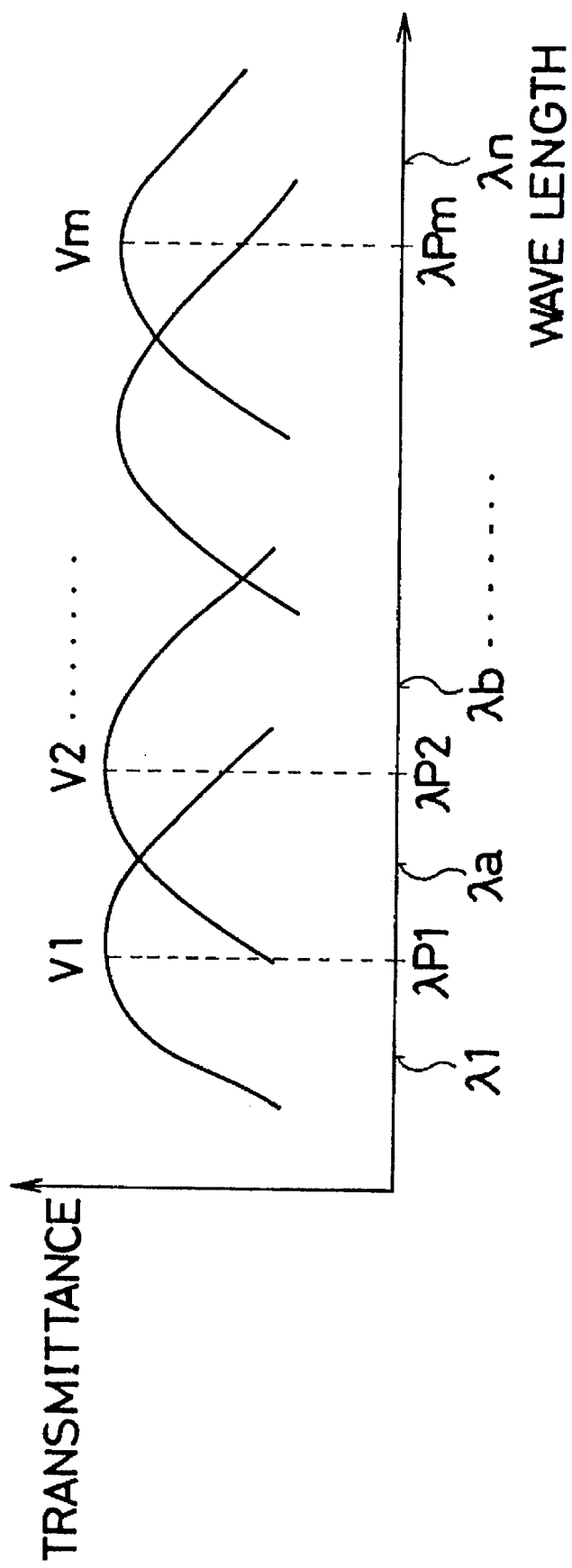
FIG. 15 is a graph showing a relationship between voltages applied to an optical shutter array and transmittances.
Figure 16:
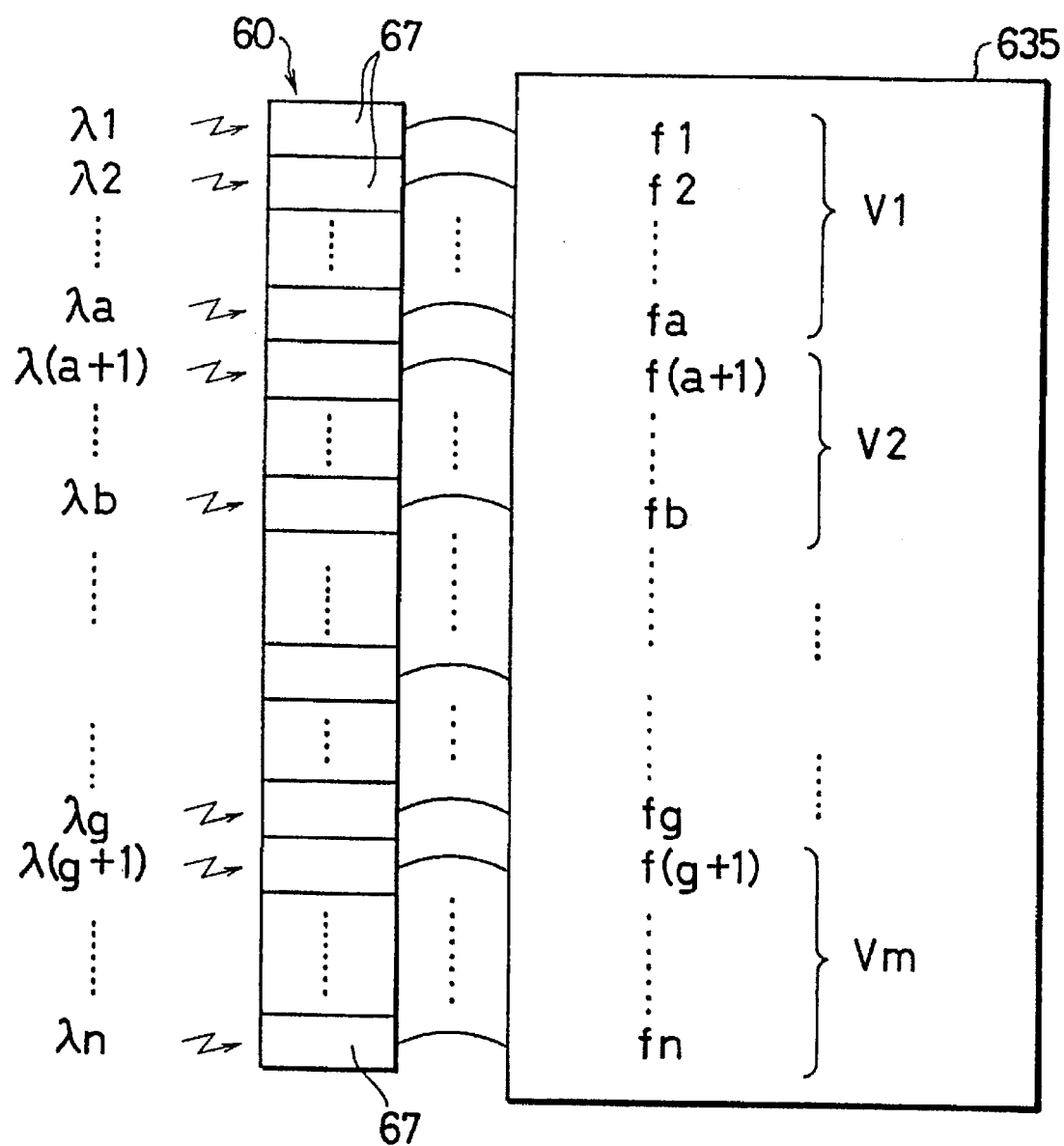
FIG. 16 is a diagram showing a schematic construction of an optical shutter device of a seventh spectrometer embodying the invention.

FIG. 15 is a graph showing a general relationship between voltages applied to an optical shutter array and transmittances. FIG. 16 is a diagram showing a schematic construction of an optical shutter of the seventh spectrometer, particularly, showing applied voltages and drive frequencies for an optical shutter array of the optical shutter.

A relationship between voltages applied to an optical shutter array 60 and transmittances can be generally represented as shown in FIG. 15. It will be seen from FIG. 15 that transmittances at applied voltages V1 to Vm respectively have maximum values for wavelengths of $\lambda P1$ to $\lambda Pm$. Accordingly, optical shutter elements 67 which are struck by rays having wavelengths of $\lambda P1$ to $\lambda Pm$ are respectively applied with their optimum voltages V1 to Vm to permit the rays to transmit. In the foregoing embodiments or the first to sixth spectrometers, this voltage application is performed. However, it will be seen from FIG. 15 that the application of the voltages V1 to Vm permits not only the transmittance of rays having wavelengths of $\lambda P1$ to $\lambda Pm$ but also the transmittance of rays having their respective near wavelengths.

The seventh spectrometer utilizes this characteristic. Specifically, rays having wavelengths of $\lambda 1$ to $\lambda a$, $\lambda(a+1)$ to λb, λ(g+1) to λn are grouped into zones. Voltages V1 to Vm are applied to an optical shutter array 60 corresponding to corresponding zones. This voltage application assure a remarkably simplified circuit construction for an optical shutter array drive device, comparing to the foregoing embodiments in which a different voltage is applied to each shutter array element in accordance with the wavelength of an incident ray.

In the seventh embodiment, there is provided a drive device 635 as shown in FIG. 15. The drive device 635 applies voltages having a drive frequency, i.e., a frequency with which the shutter is turned on and off, of f1 to fa to first to a-th optical shutter devices 67 upon which an incident light having a wavelength of λ1 to λa at a volt of V1; and applies voltages having a drive frequency of f(a+1) to fb to (a+1)-th to b-th optical shutter elements 67 upon which an incident light having a wavelength of λ(a+1) to λb at a volt of V2. Likewise, the drive device 635 applies voltages having a drive frequency of f(g+1) to fn to (g+1)-th to n-th optical shutter elements 67 upon which an incident light having a wavelength of λ(g+1) to λn at a volt of Vm.

In this way, the drive device 635 applies voltages to a zone including a specified number of optical shutter elements 67 at the same volt, and having different frequencies to the individual optical shutter elements 67 in the same zone.

Since the transmittance of the optical shutter array 60 varies with temperature, the temperature of the optical shutter array 60 may be detected by the temperature detector 7 and the applied voltage Vi (i=1, 2, ..., m) may be changed according to the detected temperature.

Alternatively, a heater for heating the optical shutter array 60 may be provided so that the optical shutter array 60 can be kept at a fixed temperature.

An eighth spectrometer of the present invention will be described with reference to FIGS. 17 and 18. The eighth spectrometer basically has the same construction as the first and second spectrometers except an optical shutter, in similar to the seventh spectrometer.

Figure 17:
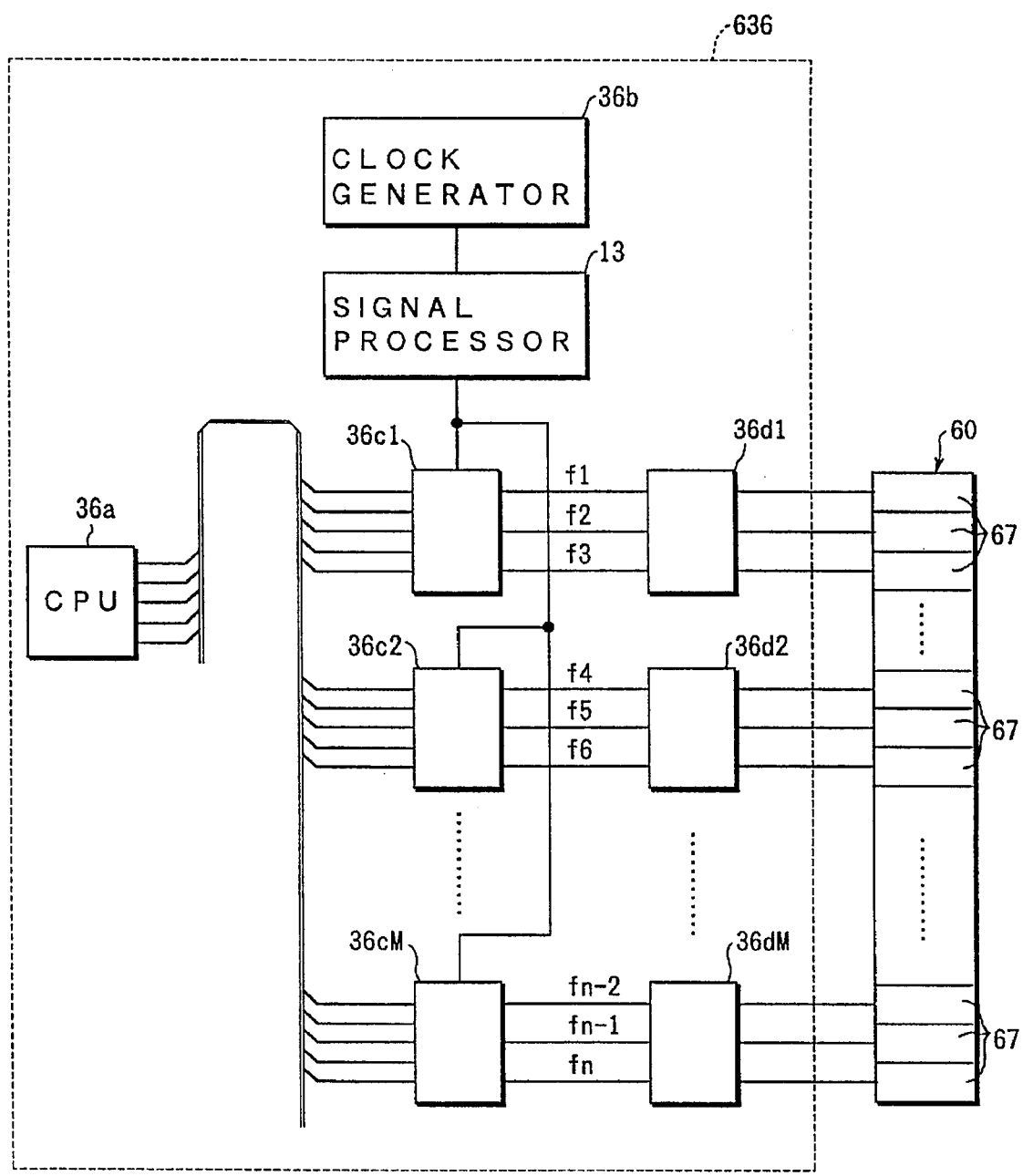
FIG. 17 is a diagram showing a schematic construction of an optical shutter device of an eighth spectrometer embodying the invention.
Figure 18:
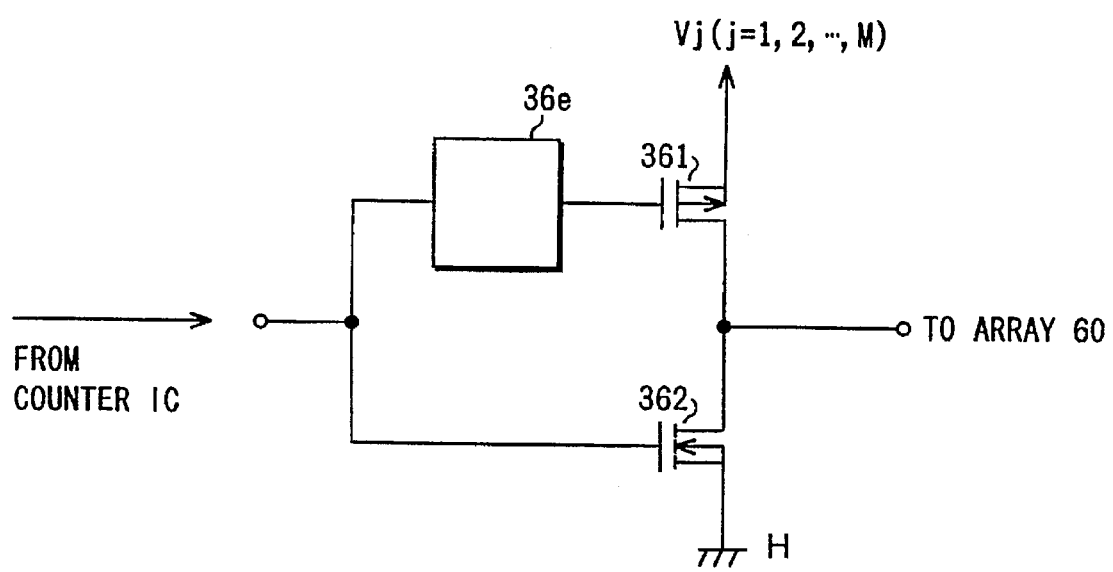
FIG. 18 is a diagram showing a construction of a voltage changing circuit of a drive device provided in the optical shutter device of FIG. 17.

FIG. 17 is a diagram showing a schematic construction of an optical shutter of the eighth spectrometer. FIG. 18 is a diagram showing a construction of a voltage changing circuit of a drive device of the optical shutter.

A drive device 636 of the eighth spectrometer includes a CPU 36a, a clock generator 36b, a counter ICs 36c1 to 36cM, and voltage changing circuits 36d1 to 36dM. The drive device 636 generates voltage signals to be sent to optical shutter elements 67. Specifically, the drive device 636 generates and sends voltage signal having the same voltage Vj (j=1, 2, ..., M) to each of M zones including a specified number of optical shutter elements 67. The voltage signals sent to the same zone have different frequencies fi (i=1, 2, ..., N) so that the voltage signals having different frequencies fi are sent to the individual optical shutter elements 67.

The CPU 36a is connected with the counter ICs 36c1 to 36cM via a data bus to set count values for the respective counter ICs. The clock generator 36b is connected with the counter ICs 36c1 to 36cM and generates reference clock signals in accordance with which the respective counter ICs perform the counting operation. The clock generator 36b includes a quartz oscillator.

Also, the clock generator 36b is connected with a signal processor 13. The signal processor 13 processes a signal from a detector 12 in accordance with a reference clock signal from the clock generator 36b.

The counter ICs 36c1 to 36cM generate rectangular wave signals having frequencies fi (i=1, 2, ..., N) by counting the input reference clock signals up to the set count values, and outputs the generated signals to the voltage changing circuits 36d1 to 36dM.

Each voltage changing circuit 36dj (J=1, 2, ..., M) includes a level shifting circuit 36e and FETs (field-effect transistors) 361, 362. The voltage changing circuit 36dj outputs a voltage signal having the same frequency as the rectangular wave signal from the corresponding counter 36cj and driving the optical shutter array 60.

The level shifting circuit 36e is provided between the counter IC 36cj and a gate of the corresponding FET 361, and converts the level of the signal output from the counter IC 36cj. In other words, the circuit 36e outputs a voltage Vj when the signal output from the counter IC 36cj is at high level, while outputting a voltage (Vj-Vz) when the signal output from the counter IC 36cj is at low level. It should be noted that Vz denotes a voltage to turn on the FET 361.

The FET 361 has its drain connected with a drain of the FET 362 and its source connected with a voltage Vj. The FET 362 has its gate and source connected with the counter IC 36cj and an earth, respectively.

In the above construction, the count values for the counter ICs 36cj are set in advance by the CPU 36a; the rectangular wave signals having frequencies fi (i=1, 2, ..., N) are generated by counting the input reference clock signals up to the set count values; and the generated signals are input to the voltage changing circuits 36dj (j=1, 2, ..., M).

When the output signal of the counter IC 36cj is at high level, the FET 361 is turned off while the FET 362 is turned on. Thereby, a voltage 0 is output from the voltage changing circuit 36dj. On the other hand, when the output signal of the counter IC 36cj is at low level, the FET 361 is turned on while the FET 362 is turned off. Thereby, a voltage Vj is output from the voltage changing circuit 36dj.

With the drive device 636 having a simple construction, the voltage signals having the same voltage can be applied to each zone including a specified number of optical shutter elements 67 of the optical shutter array 60 and the voltage signals having different frequencies fi (i=1, 2, ..., N) can be applied to the individual optical shutters 67 of each zone.

In the eighth spectrometer, as shown in FIG. 17, a rectangular wave signal having a desired frequency is generated the counter IC 36c1 (36c2 to 36cM). The frequency accuracy of a generated rectangular wave signal depends on the frequency accuracy of a clock signal generated by the clock generator 36b. The clock generator 36b includes a quartz oscillator. It is known that the output of a quartz oscillator has a very stabilized frequency. Accordingly, the drive device 636 of the eighth spectrometer can generate driving signals having very stabilized frequencies, comparing to the drive device having a capacitor oscillator or the like.

Also, a detected signal from the detector 12 is processed in accordance with a reference clock signal from the clock generator 36b. Accordingly, even if there is a variation in the frequency of a reference clock signal from the clock generator 36b, this variation will be vanished in the signal processor 13 because the signal processor executes the signal processing using the same clock signal.

Figure 19:
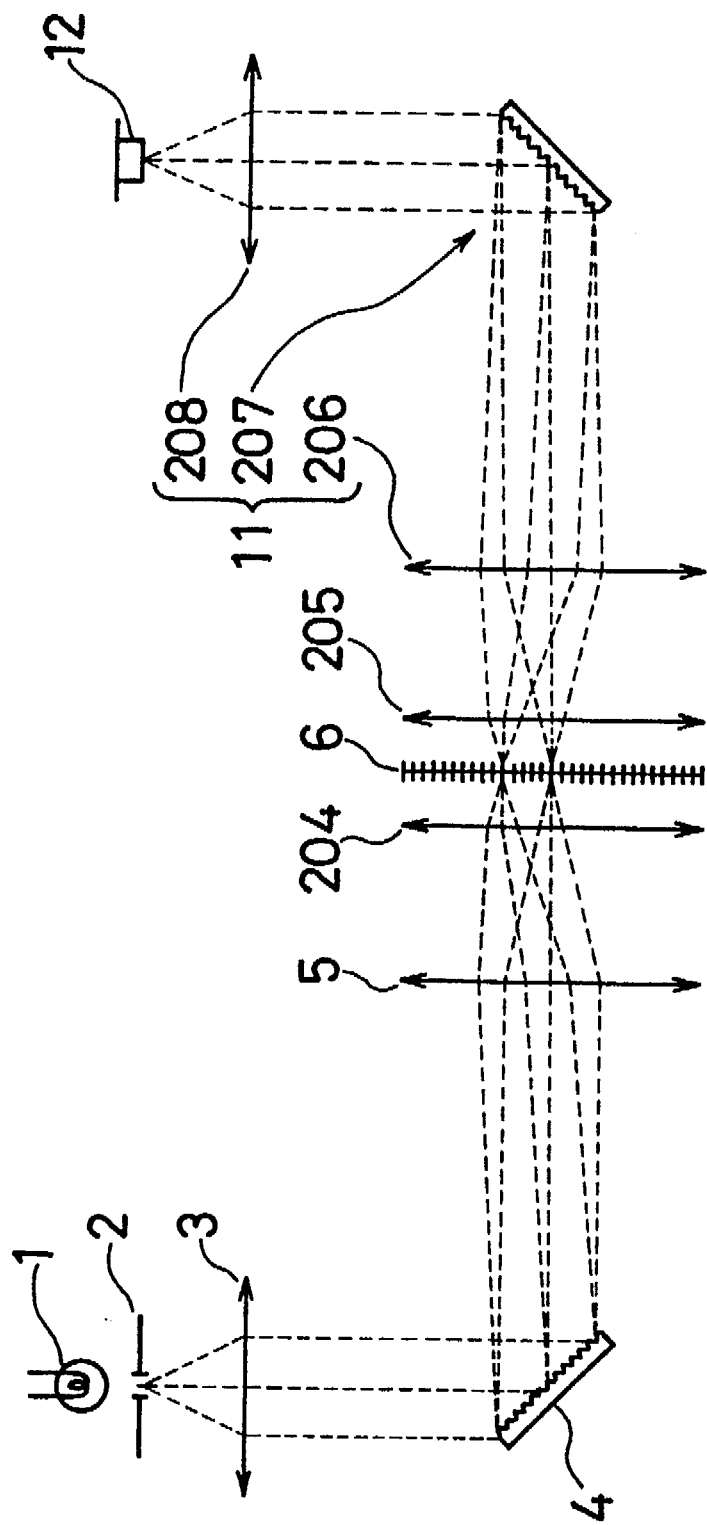
FIG. 19 is a diagram showing a schematic construction of a ninth spectrometer embodying the invention.
Figure 20:
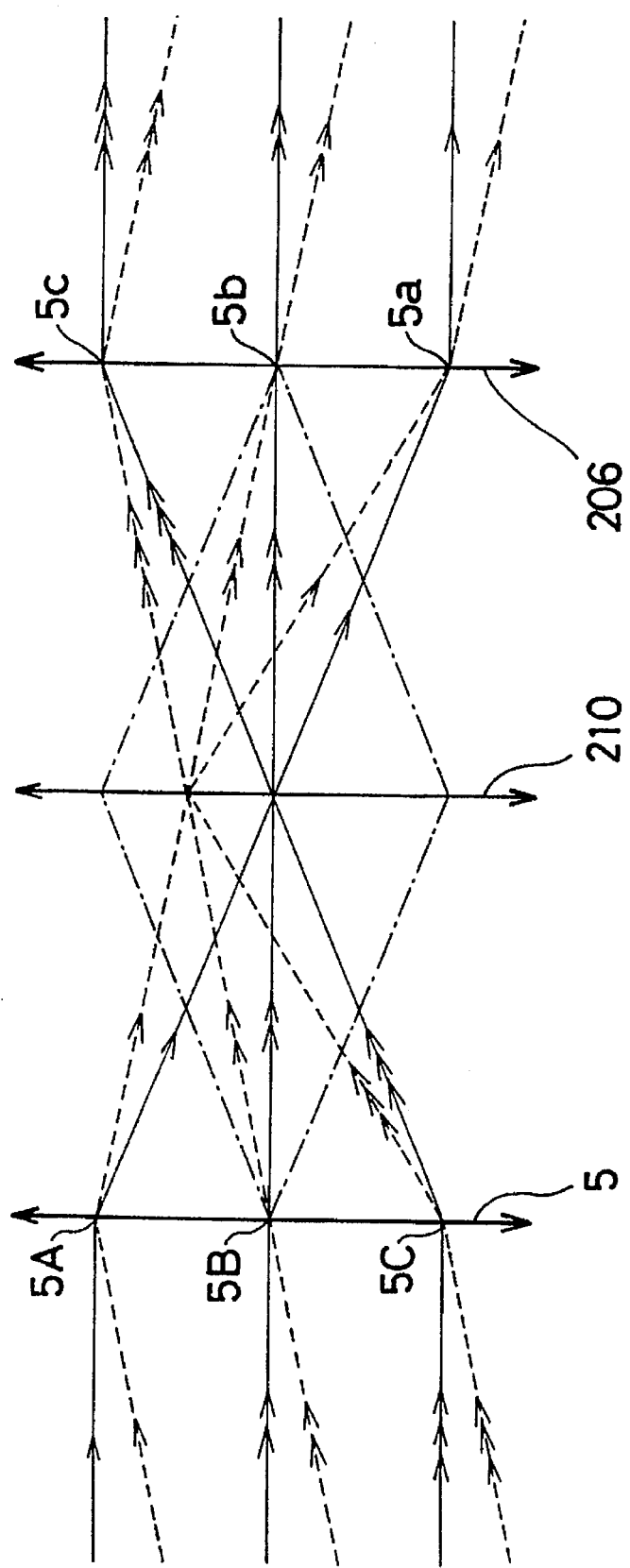
FIG. 20 is a diagram enlargedly showing rays in the vicinity of an optical axis of the ninth spectrometer.

A ninth spectrometer will be described with reference to FIGS. 19 and 20. FIG. 19 shows a schematic construction of the ninth spectrometer. As shown in FIG. 19, the ninth spectrometer differs from the first spectrometer shown in FIG. 1 in that: the first and second optical systems 3 and 5 are constituted by lenses, the diffraction device 4 is constituted by a plane diffraction grating, lenses 204, 205 are provided upstream and downstream from the multi-slit 6, and the condenser lens 11 is constituted by a lens 206, a plane diffraction grating 207, and a lens 208.

The function of the lenses 204 and 205 are described with reference to FIG. 20. FIG. 20 enlargedly shows a ray of light in the vicinity of an optical axis between the lens 5 and the lens 206. The illustrated rays are different from the rays shown in FIG. 19. Further, in FIG. 20, instead of the lenses 204 and 205, a lens 210 having an optical characteristic which is a combination of the optical characteristics of the lenses 204 and 205 is disposed for the sake of convenience.

Specifically, the lens 210 has an optical characteristic for focusing object points 5A, 5B, 5C on a plane of the lens 5 to image points 5a, 5b, 5c on a plane of the lens 206.

The rays traveling remotely from the optical axis and focused on the lens 210 through the lens 5 (indicated by dotted lines in FIG. 20) are refracted by the lens 210 and, after passing through the lens 210, become laterally symmetric rays with respect to the lens 210.

In the actual spectrometer, the lens 210 is constituted by the lenses 204 and 205, and the optical shutter array of the multi-slit 6 is disposed in a combined principal point of the lenses 204 and 205. With this construction, the rays become laterally symmetric with respect to the optical shutter array of the multi-slit 6, and accordingly main rays of the rays traveling remotely from the optical axis and main rays of rays traveling right along the optical axis (indicated by solid lines in FIG. 20) are incident upon the optical shutter array of the multi-slit 6 perpendicularly thereto.

In the above construction, the rays having passed through the slit plate 2 are made into parallel rays by the lens 3, and are diffracted in a direction corresponding to their wavelengths by the plane diffraction grating 4. The diffracted rays are focused by the lens 5 to form slit images of respective wavelengths on the multi-slit 6. The rays whose frequencies were modulated by the multi-slit 6, after passing through the lenses 205 and 206, have their directions aligned for the respective wavelengths by the plane refraction grating 207, and are focused on the detector 12 by the lens 208.

Without the lenses 204 and 205, the lens 206, the plane diffraction grating 207, and the lens 208 need to have a very large area in order to gather all the rays. The condenser lens 11 including the lens 206, the plane diffraction grating 207 and the lens 208 can be made smaller by gathering the rays by means of the lenses 204 and 205.

Further, without the lenses 204 and 205, the main rays of the rays traveling remotely from the optical axis are obliquely incident upon the optical shutter array of the multi-slit 6. In the case that the optical shutter array of the multi-slit 6 is a PLZT in the form of a solid, a part of the rays may be vignetted. Such an event can be prevented by providing the lenses 204 and 205.

Figure 21:
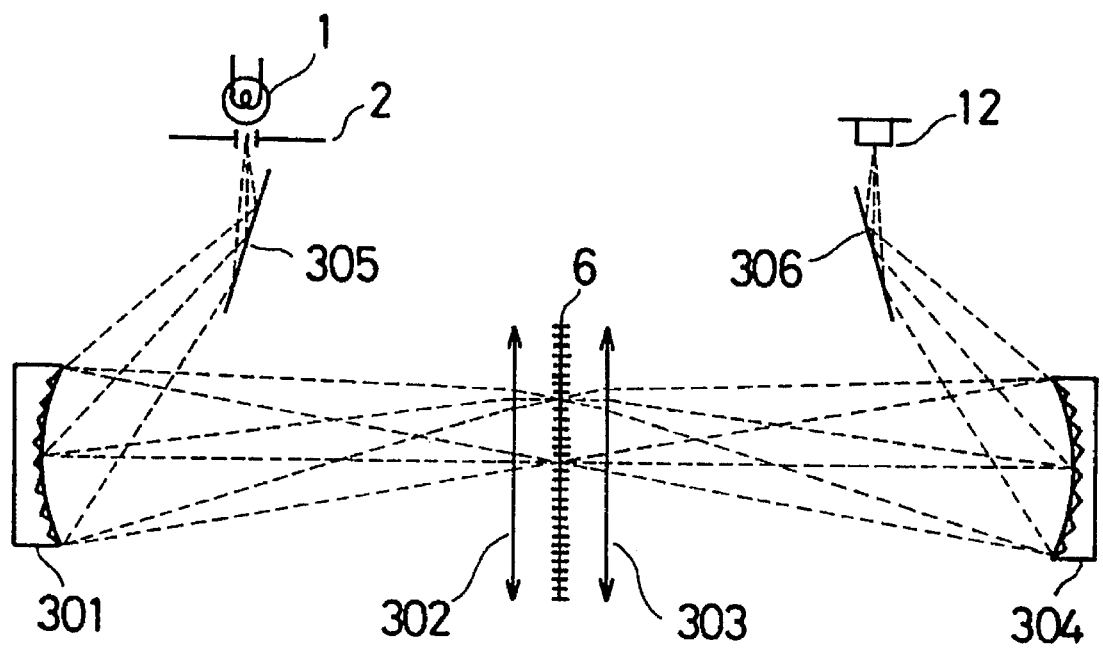
FIG. 21 is a diagram showing a schematic construction of a tenth spectrometer embodying the invention.
Figure 22:
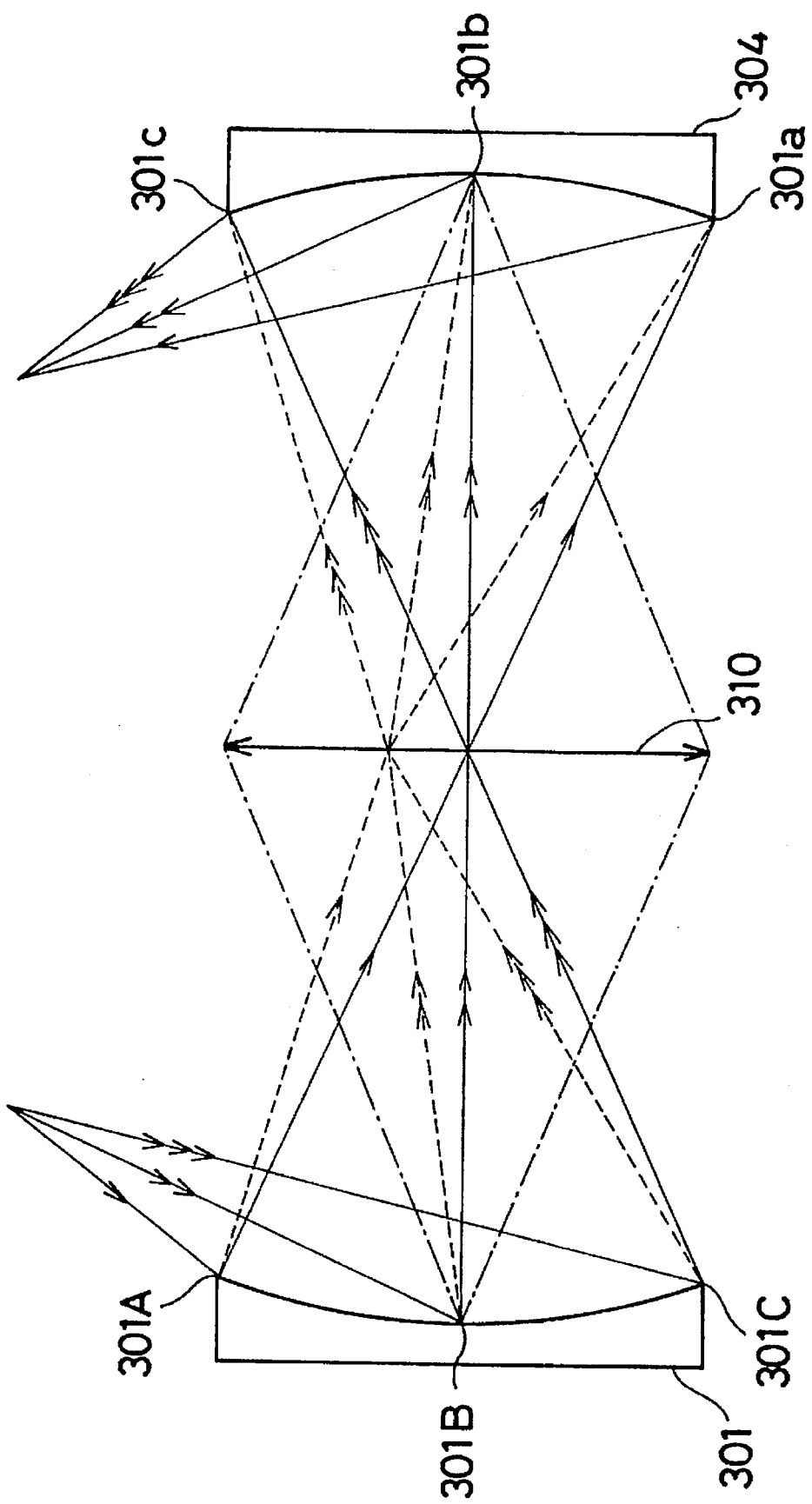
FIG. 22 is a diagram enlargedly showing rays between concave diffraction gratings of the tenth spectrometer.

A tenth spectrometer is shown in FIGS. 21 and 22. As shown in FIG. 21, the tenth spectrometer differs from the first spectrometer shown in FIG. 1 in that: the first optical system 3, the diffraction device 4, and the second optical system 5 are replaced by a concave diffraction grating 301, the condenser lens 11 is replaced by a concave diffraction grating 304, and lenses 302 and 303 are disposed upstream and downstream from the multi-slit 6, respectively. Further, reflection mirrors 305 and 306 are disposed immediately downstream from the slit plate 2 and immediately upstream from the detector 12, respectively. The reflection mirror 305 is adapted to reflect the rays having passed through the slit plate 2 toward the concave diffraction grating 301. Further, the reflection mirror 306 is adapted to reflect the rays from the concave diffraction grating 304 toward the detector 12.

The function of the lenses 302 and 303 is described with reference to FIG. 22. FIG. 22 enlargedly shows the rays between the concave diffraction gratings 301 and 305 in FIG. 21. Further, in FIG. 22, instead of the lenses 302 and 303, a lens 310 having an optical characteristic which is a combination of the optical characteristics of the lenses 302 and 303 is disposed for the sake of convenience.

The lens 310 has an optical characteristic for focusing object points 301A, 301B, 301C on a plane of the concave diffraction grating 301 to image points 301a, 301b, 301c on a plane of the concave diffraction grating 304.

The rays traveling remotely from the optical axis and focused on the lens 310 through the concave diffraction grating 301 (indicated by dotted lines in FIG. 22) are refracted by the lens 310 and, after passing through the lens 310, become laterally symmetric rays with respect to the lens 310.

In the actual spectrometer, the lens 310 is constituted by the lenses 302 and 303, and the optical shutter array of the multi-slit 6 is disposed in a combined principal point of the lenses 302 and 303. With this construction, the rays become laterally symmetric with respect to the optical shutter array of the multi-slit 60 and accordingly main rays of the rays traveling remotely from the optical axis and main rays of the rays traveling right along the optical axis (indicated by solid lines in FIG. 22) are incident upon the optical shutter array of the multi-slit 6 perpendicularly thereto.

In the above construction, the rays having passed through the slit plate 2 are reflected toward the concave diffraction grating by the reflection mirror 305. The reflected rays are gathered by the concave diffraction grating 301 to form slit images of respective wavelengths on the multi-slit 6. The rays whose frequencies were modulated by the multi-slit 6 are, after passing through the lens 303 and being gathered by the concave diffraction grating 304, reflected by the reflection mirror 306 to be focused on the detector 12.

Without the lenses 302 and 303, the concave diffraction grating 304 needs to have a very large area in order to gather all the rays. The condenser lens 11 including the concave diffraction grating 304 can be made smaller by gathering the rays by means of the lenses 302 and 303.

Further, without the lenses 302 and 303, the main rays of the rays traveling remotely from the optical axis are obliquely incident upon the optical shutter array of the multi-slit 6. In the case that the optical shutter array of the multi-slit 6 is a PLZT in the form of a solid, a part of the rays may be vignetted. Such an event can be prevented by providing the lenses 302 and 303.

Next, an eleventh spectrometer will be described. The eleventh spectrometer basically has the same construction as the first and second spectrometers except a signal processor. The signal processor 13 of the eleventh spectrometer calculates an intensity of a ray which has passed through an optical shutter element of an optical shutter array, that is, an amplitude component of each wavelength based on the output from the detector 12 in the procedure described below.

Figure 23:
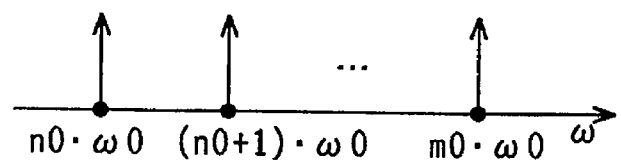
FIG. 23 is a chart showing an angular frequency ωk used in a signal processing of a signal processor provided in an eleventh spectrometer embodying the invention.

Let is be assumed that $\omega k$ ($k=n0, n0+1, \ldots, m0$) defined by Equation (9) denotes an angular frequency of a drive signal applied to each optical shutter element 67 of the optical shutter array 60, as shown in FIG. 23.

$$\omega k = k \omega 0 \qquad (9)$$

(where $\omega 0$ denotes a reference angular frequency)

In this case, a signal x(t) detected by the detector 12 is expressed as in Equation (10).

$$x(t) = \sum_{k=-\infty}^{\infty} Ck \cdot e^{j\omega k t} \tag{10}$$

where $$Ck = \begin{cases} |Ck| \cdot e^{j\phi k} & (|k| = n0, n0+1, \ldots, m0) \\ 0 & (\text{unless otherwise}) \end{cases} \tag{11}$$

$$\omega k = k\omega 0 \tag{12}$$

where |Ck| denotes an amplitude component of a drive signal having an angular frequency ωk, φk denotes a phase component of this drive signal, and |k|=n0, n0+1, ..., m0.

The output signal of the detector 12 has a rectangular waveform, but high frequency wave components are blocked by causing this output signal to pass through a low pass filter.

The amplitudes of the rays modulated by the respective optical shutter elements 67 of the optical shutter array 60 are calculated in accordance with Equation (13) which is obtained by Fourier-transforming Equation (10).

$$Cn = 1/T0 \int_0^{T0} x(t) \cdot e^{-jn\omega 0 t} dt \tag{13}$$

where $$T0 = 2\pi/\omega 0 \text{ (reference cycle)} \tag{14}$$

$$|Cn| = \sqrt{(Re[Cn])^2 + (Im[Cn])^2} \tag{15}$$

$$\phi_n = \tan^{-1}(Im[Cn]/Re[Cn]) \tag{16}$$

In the procedure as described above, the signal processor 13 calculates the amplitudes of the respective wavelengths of the rays modulated by the optical shutter elements 67 of the optical shutter array 60 based on the output of the detector 12.

A twelfth spectrometer will be next described. In similar to the eleventh spectrometer, the twelfth spectrometer basically has the same construction as the first and second spectrometers except an optical shutter and a signal processor. The optical shutter is identical to that used in the eighth spectrometer shown in FIG. 17.

The signal processor 13 of the twelfth spectrometer corrects an influence of a frequency error of the drive signal of the optical shutter device 67 when calculating an amplitude component of each wavelength based on the output from the detector 12 in the procedure described below.

Figure 24:
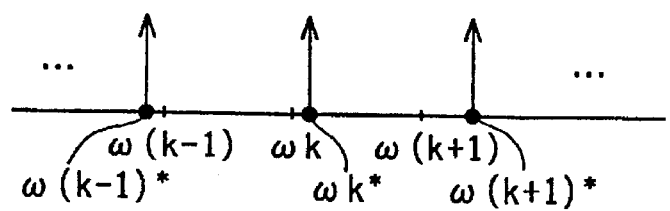
FIG. 24 is a chart showing an angular frequency actually used for a drive signal of an optical shutter device of a twelfth spectrometer embodying the invention.

Here, the drive signals for the respective optical shutter elements 67 of the optical shutter array 60 are assumed to be generated in a drive device 636 identical to that of the eighth spectrometer. In this case, the cycle of the drive signal is quantized in accordance with the cycle of the reference clock input to the counter IC. Accordingly, it is difficult to accurately set the angular frequency of the drive signal to ωk. Thus, the angular frequency actually used is ωk* as shown in FIG. 24.

Accordingly, the signal x(t) actually detected by the detector 12 is expressed in Equation (17).

$$x(t) = \sum_{k=-\infty}^{\infty} Ck \cdot e^{j\omega k^* t} \tag{17}$$

where $$Ck = \begin{cases} |Ck| \cdot e^{j\phi k} & (|k| = n0, n0+1, \ldots, m0) \\ 0 & (\text{unless otherwise}) \end{cases} \tag{18}$$

$$\omega k = k\omega 0$$

At this time, the angular frequency of the drive signal is not a multiple of the reference angular frequency ω0. Accordingly, the amplitudes Ck of the rays modulated by the respective optical shutter elements 67 of the optical shutter array 60 cannot be directly calculated in accordance with Equation (19) which is obtained by Fourier-transforming Equation (17).

$$C^*(\omega n) = \int_0^{T0} x(t) \cdot e^{-j\omega n t} dt \tag{19}$$

Figure 25:
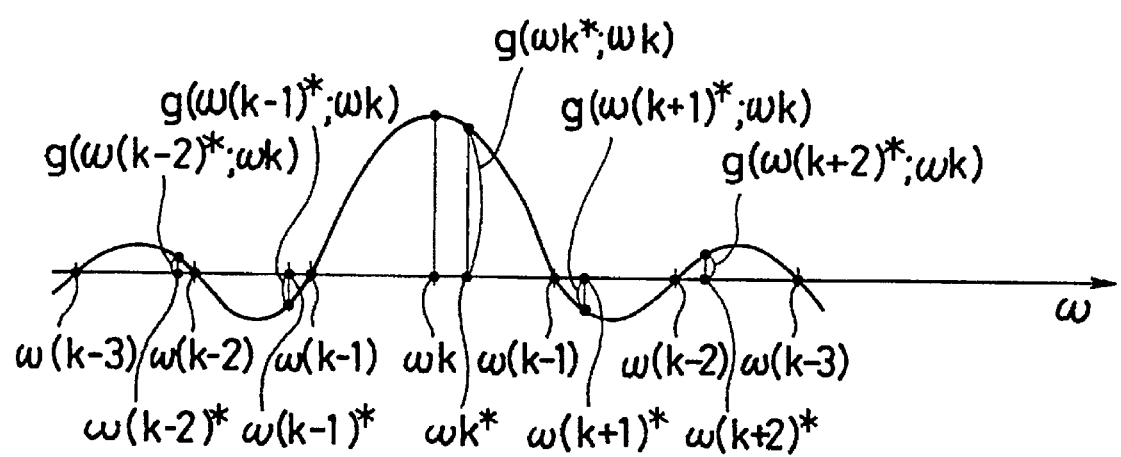
FIG. 25 is a graph showing a Fourier transform used in a signal processing of a signal processor of the twelfth spectrometer.

Conceiving the Fourier transform in an angular frequency domain, it is a convolution with a sinc function as shown in FIG. 25. Unless the angular frequency of the drive signal is a multiple of the reference angular frequency ω0, the result of the Fourier transform with respect to the angular frequency ωn between time 0 and T0 is a sum of products of the amplitude components |Ck| of the angular frequency ωk* (|k|=n0, n0+1, ..., m0) and a function g(ωk*; ωn) as defined in Equation (20).

$$C^*(\omega n) = \sum_{k=n0}^{m0} |Ck| \cdot g(\omega k^*; \omega n) \tag{20}$$

where n=n0, n0+1, ..., m0

Equation (20) can be expressed in the following matrix:

$$C^* = G \cdot C \tag{21}$$

where C* denotes a matrix including C*(ωn) as an element; G denotes a matrix including the function g(ωk*; ωn) as an element; C denotes a matrix including Ck as an element; n=n0, n0+1, ..., m0; |k|=n0, n0+1, ..., m0. This matrix can be expressed with respect to each of the real part and the imaginary part of Equation (20).

By solving Equation (21), the amplitudes |Ck| (|k|=n0, n0+1, ..., m0) of the light modulated by the respective optical shutter elements 67 of the optical shutter array 60 can be calculated.

In the procedure as described above, the signal processor 13 calculates the amplitude components of the respective wavelengths of the rays modulated by the optical shutter elements 67 of the optical shutter array 60 based on the output of the detector 12.

Figure 26:
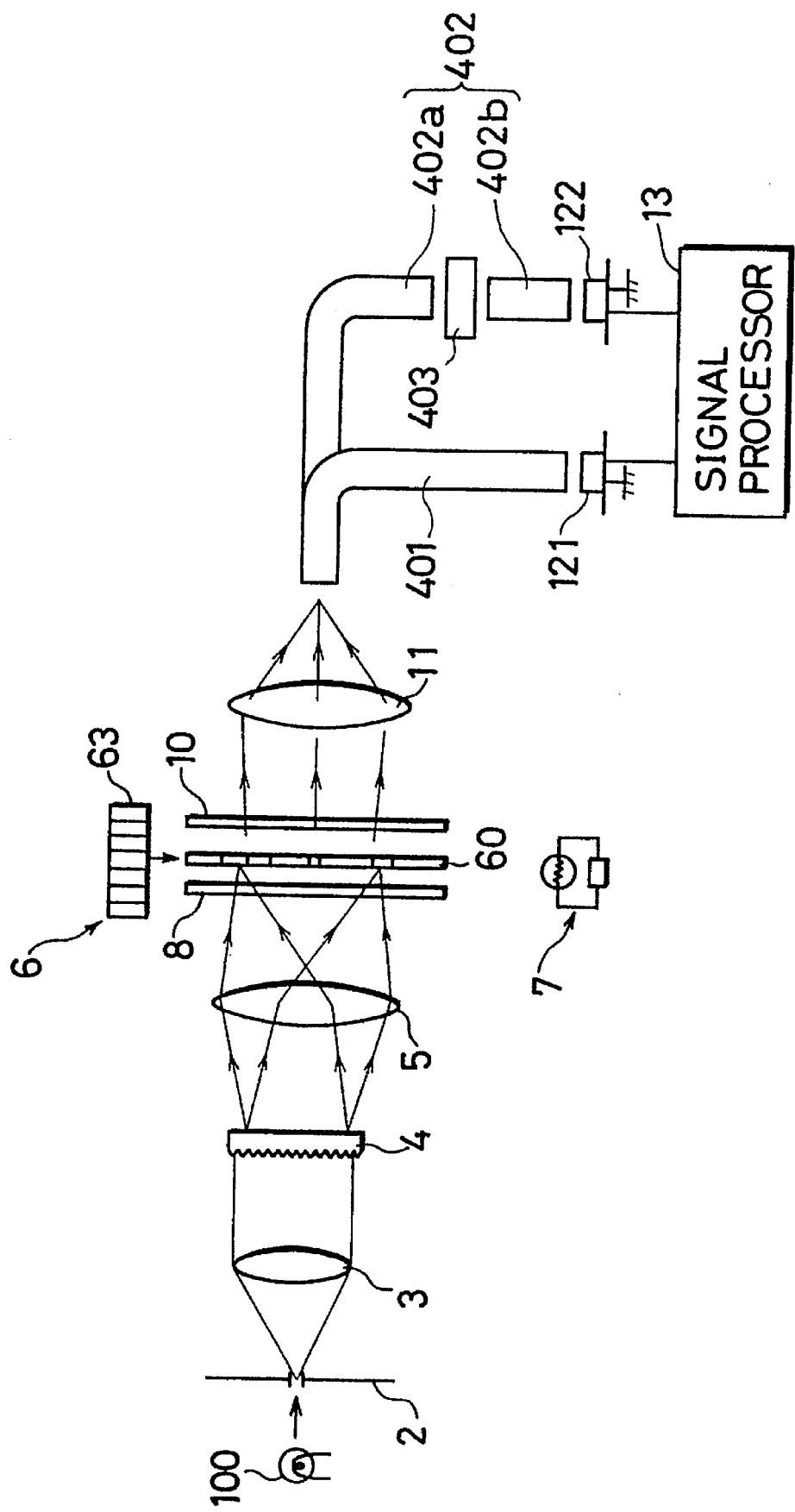
FIG. 26 is a diagram showing a schematic construction of a thirteenth spectrometer embodying the invention, measuring a transmittance characteristic of a sample.
Figure 27:
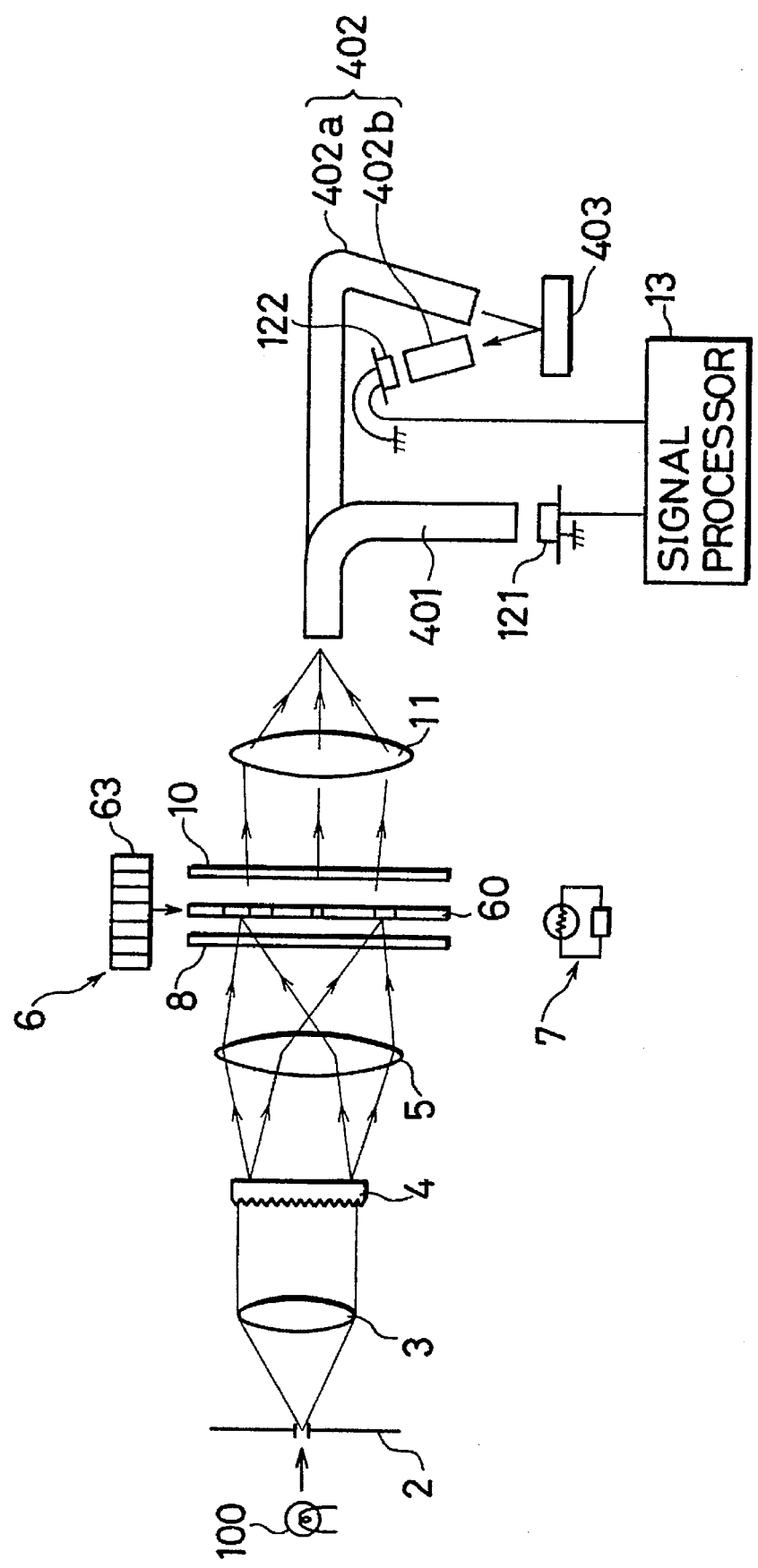
FIG. 27 is a diagram showing a schematic construction of the thirteenth spectrometer, measuring a reflection characteristic of a sample.

A thirteenth spectrometer will be described with reference to FIGS. 26 and 27. FIGS. 26 and 27 are diagrams showing a schematic construction of the spectrometer according to the thirteenth spectrometer.

The thirteenth spectrometer measures a transmittance characteristic (FIG. 26) and a reflection characteristic (FIG. 27) of a sample.

In FIG. 26, a light source 100 emits reference rays of light on the basis of which the sample is measured. Optical fibers 401 and 402 are disposed downstream from the condenser lens 11. An incident end of each of the optical fibers 401 and 402 is disposed in a position where the rays having passed through the condenser lens 11 are focused, and a detector 121 is disposed at the outgoing end of the optical fiber 401. The optical fiber 402 includes optical fibers 402a, 402b, and a sample 403 to be measured is disposed between the optical fibers 402a and 402b. The rays coming out of the optical fiber 402a are incident on the optical fiber 402b through the sample 403. A detector 122 is disposed at the outgoing end of the optical fiber 402b.

In the above construction, the rays having emitted from the light source 100 and passed through the slit plate 2 are made into parallel rays by the first optical system 3, and are diffracted at angles corresponding to their wavelengths by the diffraction device 4. The diffracted rays are focused on the optical shutter of the multi-slit 6 for the respective wavelengths by the second optical system 5. After being modulated for the respective wavelengths by the multi-slit 6, a part of the focused rays are focused on the incident end of the optical fiber 401 and the remaining focused rays are focused on the incident end of the optical fiber 402a. The rays incident upon the optical fiber 401 are incident upon the detector 121, whereas the rays incident upon the optical fiber 402a are incident upon the detector 122 through the sample 403 and the optical fiber 402b.

The signal processor 13 performs the above-mentioned signal processing to calculate the intensities of the rays from the light source 100 for the respective wavelengths based on the output of the detector 121, and to calculate the intensities of the rays having passed through the sample 403 for the respective wavelengths based on the output of the detector 122. Further, ratios of the intensities of the rays having passed through the sample 403 to the intensities of the rays from the light source 100 for the respective wavelengths are calculated and normalized. In this way, the transmittance characteristic of the sample 403 is measured.

In FIG. 27, the optical fiber 402 includes the optical fibers 402a and 402b, and the sample 403 is disposed such that the rays coming out of the optical fiber 402a are reflected by the sample 403 and are then incident upon the optical fiber 402b.

The signal processor 13 performs the above-mentioned signal processing to calculate the intensities of the rays from the light source 100 for the respective wavelengths based on the output of the detector 121, and to calculate the intensities of the rays reflected by the sample 403 for the respective wavelengths based on the output of the detector 122. Further, ratios of the intensities of the rays reflected by the sample 403 to the intensities of the rays from the light source 100 for the respective wavelengths are calculated and normalized. In this way, the reflection characteristic of the sample 403 is measured.

According to the thirteenth spectrometer, since the rays from the condenser fens 11 are separated, and since the rays transmitted through or reflected by the sample 403 and the rays from the light source 100 are detected, the transmittance characteristic ,and reflection characteristic of the sample 403 can be measured.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An optical switching system comprising:

an optical shutter array member including a plurality of optical shutter elements;

a first lens, provided upstream from said optical shutter array member, for focusing incident rays on a plane of said optical shutter elements;

a second lens, provided downstream from said optical shutter array member, for collimating the rays focused on the plane of said optical shutter elements;

a third lens, provided between said first lens and said optical shutter array member; and a fourth lens, provided between said second lens and said optical shutter array member;

a combined principal point of said third and fourth lens being disposed on the plane of said optical shutter elements, and a combination of optical characteristics of said third and fourth lens having a refracting power which makes rays passing through said optical shutter elements laterally symmetric with respect to said optical shutter elements.

2. The optical switching system according to claim 1, wherein the combination of optical characteristics of said third and fourth lenses has a refracting power which makes main rays of rays traveling remotely off-axis from a optical axis and main rays of rays traveling along the optical axis incident upon the optical shutter elements perpendicularly thereto.

3. The optical switching system according to claim 1, further comprising a first diffracting member, provided upstream from said first lens, for diffracting an incident light according to wavelength, wherein each of said optical shutter elements receives a ray of corresponding wavelengths thereto diffracted by said first diffracting member.

4. The optical switching system according to claim 3, further comprising a second diffracting member, provided downstream from said second lens, for aligning directions of the diffracted rays passing through the optical shutter elements to combine the diffracted rays into a light.

5. The optical switching system according to claim 4, further comprising:

a fifth lens, provided upstream from said first diffracting member, for collimating incident light; and a sixth lens, provided downstream from said second diffracting member, for focusing the light combined by said second diffracting member.

6. The optical switching system according to claim 5, further comprising a signal processor for receiving the light focused by said sixth lens and outputting an electrical signal according to an intensity of the received light.

7. The optical switching system according to claim 6, further comprising a calculator for calculating the intensity of the incident light to said fifth lens for each wavelength in accordance with the electrical signal output from said signal processor.

8. The optical switching system according to claim 1, wherein said optical shutter elements are made of PLZT.

9. An optical switching system comprising:

an optical shutter array member including a plurality of optical shutter elements;

a first concave diffraction grating, provided upstream from said optical shutter array member, for diffracting an incident light according to wavelength and focusing the diffracted rays on each of said optical shutter elements corresponding to the wavelength thereof;

a second concave diffracting grating, provided downstream from said optical shutter array member, for aligning directions of the diffracted rays passing through the optical shutter elements to combine the diffracted rays into a light and focusing the combined light;

a first lens, provided between said first concave diffraction grating and said optical shutter array member; and a second lens, provided between said second concave diffraction grating and said optical shutter array member;

a combined principal point of said first and second lenses being disposed on the plane of said optical shutter elements, and a combination of optical characteristics of said first and second lenses having a refracting power which makes rays passing through said optical shutter elements laterally symmetric with respect to said optical shutter elements.

10. The optical switching system according to claim 9, wherein the combination of optical characteristics of said first and second lenses has a refracting power which makes main rays of rays traveling remotely from an optical axis and the main rays of the rays and traveling along the optical axis incident upon the optical shutter elements perpendicularly thereto.

11. The optical switching means according to claim 9, further comprising a signal processor for receiving the light focused by said second concave diffraction grating and outputting an electrical signal according to an intensity of the received light.

12. The optical switching system according to claim 11, further comprising a calculator for calculating the intensity of the incident light to said first concave diffraction grating for each wavelength in accordance with the electrical signal output from said signal processor.

13. The optical switching system according to claim 9, wherein said optical shutter elements are made of PLZT.

14. A spectrometer comprising:

an optical shutter array member including a plurality of optical shutter elements;

a first optical unit, provided upstream from said optical shutter array member, for diffracting an incident light to be measured according to wavelength and focusing the diffracted rays on each of said optical shutter elements corresponding to the wavelength thereof;

a second optical unit, provided downstream from said optical shutter array member, for combining the diffracted rays passing through the optical shutter elements;

a first lens, provided between said first optical unit and said optical shutter array member;

a second lens, provided between said second optical unit and said optical shutter array member, a combined principal point of said first and second lenses being disposed on the plane of said optical shutter elements, and a combination of optical characteristics of said first and second lenses having a refracting power which makes rays passing through said optical shutter elements laterally symmetric with respect to said optical shutter elements;

a signal processor for receiving the light combined by said second optical unit and outputting an electrical signal according to an intensity of the received light; and a calculator for calculating the intensity of the incident light to be measured for each wavelength in accordance with the electrical signal output from said signal processor.

15. The spectrometer according to claim 14, wherein the combination of optical characteristics of said first and second lenses has a refracting power which makes main rays of the rays traveling remotely from an optical axis and the main rays of the rays traveling along the optical axis incident upon the optical shutter elements perpendicularly thereto.

16. The spectrometer according to claim 14, wherein said optical shutter elements are made of PLZT.

17. The spectrometer according to claim 14, wherein said first and second optical units include a plane diffraction grating and a convex lens.

18. The spectrometer according to claim 14, wherein said first and second optical units include a concave diffraction grating.

19. An optical switching system comprising:

an optical shutter array member including a plurality of optical shutter elements;

a first optical unit, provided upstream from said optical shutter array member, for diffracting an incident light according to wavelength and focusing the diffracted rays on each of said optical shutter elements corresponding to the wavelength thereof;

a second optical unit, provided downstream from said optical shutter array member, for combining the diffracted rays passing through the optical shutter elements;

a first lens, provided between said first optical unit and said optical shutter array member;

a second lens, provided between said second optical unit and said optical shutter array member, a combined principal point of said first and second lenses being disposed on the plane of said optical shutter elements, and a combination of optical characteristics of said first and second lenses having a refracting power which makes both of the main rays of the rays traveling remotely from an optical axis and the rays traveling right along the optical axis incident upon the optical shutter elements perpendicularly thereto.

20. The optical switching system according to claim 19, wherein said first and second optical units include a plane diffraction grating and a convex lens.

21. The optical switching system according to claim 19, wherein said first and second optical units include a concave diffraction grating.

* * * * *